(12) United States Patent
Inoue

(10) Patent No.: US 11,852,231 B2
(45) Date of Patent: Dec. 26, 2023

(54) VEHICLE DRIVE APPARATUS

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/686,903

(22) Filed: Mar. 4, 2022

(65) Prior Publication Data

US 2022/0186823 A1   Jun. 16, 2022

Related U.S. Application Data

(62) Division of application No. 17/638,012, filed as application No. PCT/JP2020/037368 on Sep. 30, 2020.

(30) Foreign Application Priority Data

Jan. 10, 2020   (JP) .................................. 2020-003165

(51) Int. Cl.
*F16H 57/02* (2012.01)
*B60K 17/16* (2006.01)
(Continued)

(52) U.S. Cl.
CPC ............. *F16H 57/02* (2013.01); *B60K 1/00* (2013.01); *B60K 17/16* (2013.01);
(Continued)

(58) Field of Classification Search
CPC ........... F16H 57/02; F16H 2057/02026; F16H 2057/02034; F16H 2057/0216; F16H 2057/02052; B60K 1/00; B60K 2001/001
See application file for complete search history.

(56) References Cited

U.S. PATENT DOCUMENTS 6,166,498 A * 12/2000 Yamaguchi ........... B60L 15/007
903/910
7,244,210 B2    7/2007 Hamai et al.
(Continued)

FOREIGN PATENT DOCUMENTS

CN      108407587 A    8/2018
CN      110011458 A    7/2019
(Continued)

OTHER PUBLICATIONS

Oct. 26, 2022 Search Report issued in European Patent Application No. 20912240.7.

(Continued)

*Primary Examiner* — Sherry L Estremsky
(74) *Attorney, Agent, or Firm* — Oliff PLC

(57) ABSTRACT

A vehicle drive apparatus includes: a rotary electric machine disposed on a first axis; a differential gear mechanism disposed on a second axis; an output member disposed on the second axis; an inverter device; and a case. The case is a single-piece case internally including: a first housing chamber housing the rotary electric machine; and a second housing chamber housing the inverter device and divided from the first housing chamber with a partition. At least a specified portion of the output member is housed in the first housing chamber. A location of the specified portion in an axial direction overlaps with the rotary electric machine. The partition is provided between the specified portion and the inverter device.

6 Claims, 13 Drawing Sheets

(51) Int. Cl.
   *B60K 1/00*    (2006.01)
   *F16H 57/021*   (2012.01)

(52) U.S. Cl.
   CPC .................. *B60K 2001/001* (2013.01); *F16H 2057/0216* (2013.01); *F16H 2057/02026* (2013.01)

(56) References Cited

U.S. PATENT DOCUMENTS

| | | |
|---|---|---|
| 7,786,640 B2 | 8/2010 | Sada et al. |
| 7,977,830 B2 | 7/2011 | Yoshida et al. |
| 10,008,904 B2 * | 6/2018 | Kuramochi ............ B60K 6/405 |
| 2005/0211490 A1 | 9/2005 | Shimizu et al. |
| 2009/0243443 A1 | 10/2009 | Aoki et al. |
| 2016/0039276 A1 | 2/2016 | Takahashi et al. |
| 2020/0280246 A1 | 9/2020 | Deng et al. |
| 2022/0190680 A1 * | 6/2022 | Jinnai ..................... F16H 57/02 |

FOREIGN PATENT DOCUMENTS

| | | |
|---|---|---|
| JP | 6172007 B2 | 8/2017 |
| JP | 2017-229174 A | 12/2017 |
| WO | 2019/051824 A1 | 3/2019 |

OTHER PUBLICATIONS

Nov. 2, 2020 Search Report issued in International Patent Application No. PCT/JP2020/037368.
May 10, 2023 Office Action issued in U.S. Appl. No. 17/638,012.
Aug. 14, 2023 Office Action issued in U.S. Appl. No. 17/638,012.

\* cited by examiner

VEHICLE DRIVE APPARATUS

CROSS-REFERENCE TO RELATED APPLICATION

This is a Division of application Ser. No. 17/638,012, filed Feb. 24, 2022, which in turn is a U.S. National Phase of PCT/JP2020/037368, filed Sep. 30, 2020, which claims the benefit of Japanese Patent Application No. 2020-003165, filed Jan. 10, 2020. The disclosure of the prior applications are hereby incorporated by reference herein in their entirety.

TECHNICAL FIELD

The present invention relates to vehicle drive apparatuses each including a rotary electric machine, an output member, a transmission mechanism, an inverter device, and a case.

BACKGROUND ART

Japanese Unexamined Patent Application Publication No. 2017-229174 (JP 2017-229174 A) discloses a "mechanically and electronically integrated" unit (1) including a rotary electric machine (3), a speed reducer (11), and an inverter device (4). Reference signs within parentheses in BACKGROUND ART correspond to those used in the publication to which reference is made. The rotary electric machine (3) and the inverter device (4) are housed in a shared housing (2) integrally including a rotary electric machine housing portion (21) and an inverter housing portion (22). The inverter device (4) is housed in the inverter housing portion (22) disposed on the rotary electric machine housing portion (21) housing the rotary electric machine (3).

RELATED ART DOCUMENTS

Patent Documents

Patent Document 1: JP 2017-229174 A

SUMMARY OF THE INVENTION

Problem to be Solved by the Invention

The inverter device of the mechanically and electronically integrated unit is disposed in a region where the inverter device overlaps with the rotary electric machine in a vertical view. This limits an installation region for the inverter device in a horizontal direction, which may make it necessary to increase an installation space for the inverter device in a vertical direction. A resulting vehicle drive apparatus may thus increase in size.

In view of these problems, what is desired is to provide a vehicle drive apparatus whose inverter device is also housed in a case, while preventing an entirety of the apparatus from increasing in size.

Means for Solving the Problem

In view of the above, a vehicle drive apparatus according to one aspect of the present invention includes: a rotary electric machine disposed on a first axis; a transmission mechanism to which a driving force is to be transmitted from the rotary electric machine; a differential gear mechanism disposed on a second axis different from and parallel to the first axis, the differential gear mechanism being configured to distribute the driving force, which is transmitted thereto from the rotary electric machine through the transmission mechanism, to a wheel; an output member disposed on the second axis and drivingly connecting the differential gear mechanism to the wheel; an inverter device to control driving of the rotary electric machine; and a single-piece case internally including a first housing chamber housing the rotary electric machine, and a second housing chamber housing the inverter device. At least a specified portion of the output member is housed in the first housing chamber. A location of the specified portion in an axial direction overlaps with the rotary electric machine. The axial direction is along the first axis. The single-piece case includes a partition dividing the first housing chamber from the second housing chamber. The partition is provided between the specified portion and the inverter device.

In this structure, the single-piece case internally includes the first housing chamber and the second housing chamber and is thus higher in rigidity than a case including a first housing chamber and a second housing chamber that are separate components assembled to the case. Unlike when the two housing chambers are separate components, this structure enables sharing of the partition dividing the first housing chamber from the second housing chamber, leading to a reduction in the weight of the case. The first housing chamber houses both of: the rotary electric machine serving as a driving force source; and the output member drivingly connected to the wheel. This enables the first axis and the second axis to be disposed close to each other, resulting in a reduction in the size of the vehicle drive apparatus. In this structure, the partition is provided between the specified portion and the inverter device. Accordingly, this structure facilitates allowing the location of the inverter device in the single-piece case to overlap with the output member in a radial direction. This structure thus facilitates preventing expansion of the second housing chamber, which houses the inverter device, in a vertical direction. Consequently, this structure is able to provide the vehicle drive apparatus whose inverter device is also housed in the case, while preventing an entirety of the apparatus from increasing in size.

Further features and advantages of the vehicle drive apparatus will be apparent from the description of illustrative and non-limiting embodiments given below with reference to the drawings.

MODES FOR CARRYING OUT THE INVENTION

Figure 1:
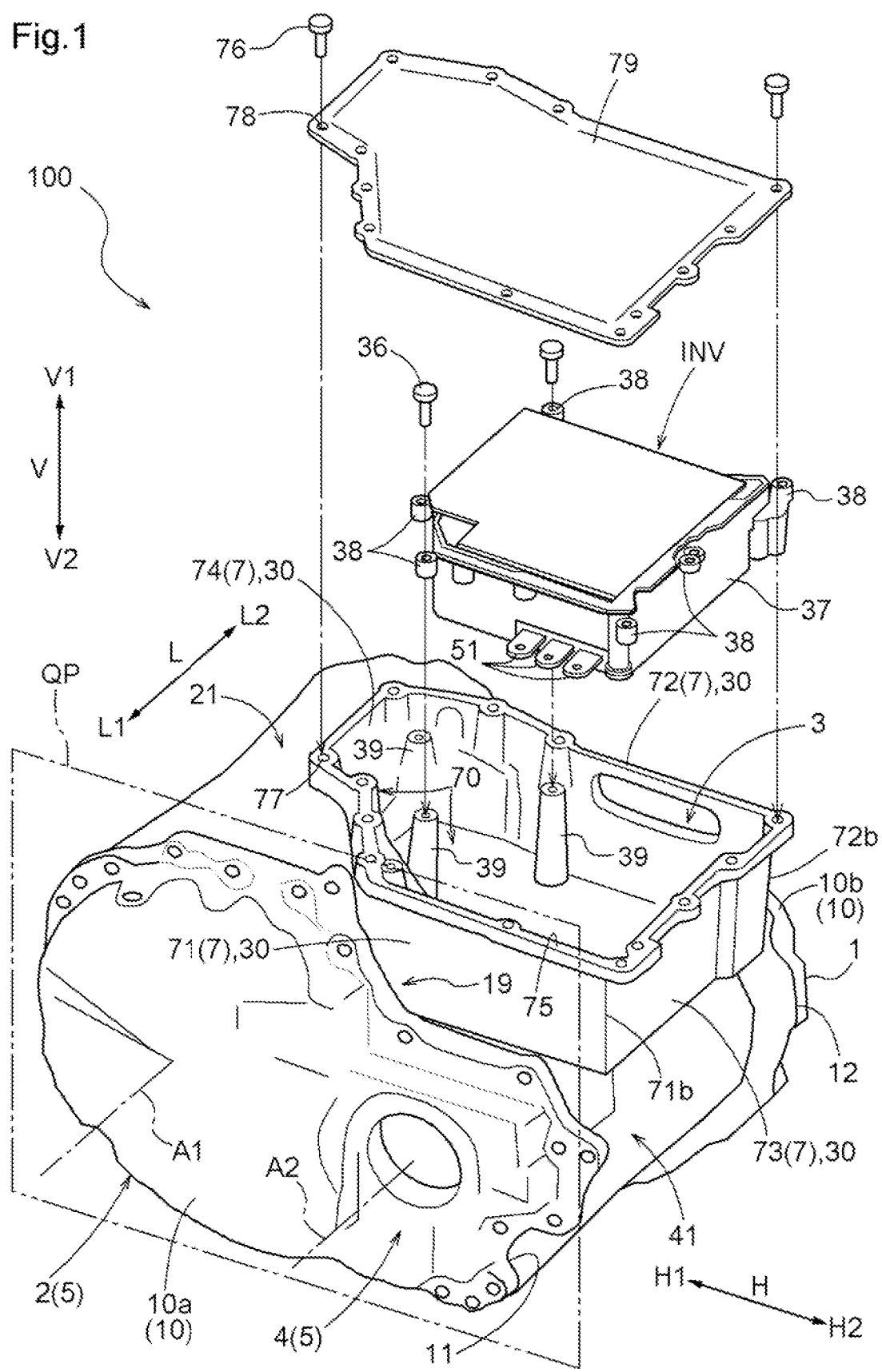
FIG. 1 is an exploded perspective view of an exemplary vehicle drive apparatus.

Embodiments of the present invention will now be described with reference to the drawings. As illustrated in, for example, the exploded perspective view of FIG. 1, the circuit block diagram of FIG. 6, and the skeleton diagram of FIG. 7, a vehicle drive apparatus 100 includes: a rotary electric machine MG disposed on a first axis A1; a pair of output members OUT disposed on a second axis A2 and drivingly connected to a pair of wheels W; a transmission mechanism TM to transmit a driving force between the rotary electric machine MG and the output members OUT; and an inverter device INV to control driving of the rotary electric machine MG. The vehicle drive apparatus 100 further includes a single-piece case 1 internally including: a device housing chamber 5 (first housing chamber) housing the rotary electric machine MG and at least a portion of each output member OUT; and an inverter housing chamber 3 (second housing chamber) housing the inverter device INV and divided from the device housing chamber 5 with a partition 70. As used herein, the term "single-piece" refers to a single-piece component provided in the form of, for example, a single die-cast product (which is produced by die casting) using similar materials.

The rotary electric machine MG is a driving force source for the pair of wheels W. The transmission mechanism TM may include a counter gear mechanism CG and a differential gear mechanism DF (output differential gear device); however, when the differential gear mechanism DF and the counter gear mechanism CG are regarded as separate components, the transmission mechanism TM is equivalent to the counter gear mechanism CG and includes no differential gear mechanism DF. The differential gear mechanism DF distributes the driving force, which is transmitted thereto from the rotary electric machine MG, to the pair of wheels W. The axis of the rotary electric machine MG (which corresponds to the first axis A1) and the axis of the differential gear mechanism DF (which corresponds to the second axis A2) are different axes disposed in parallel with each other. The axis of the counter gear mechanism CG (which corresponds to the third axis A3) is disposed in parallel to the first axis A1 and the second axis A2. The first axis A1, the second axis A2, and the third axis A3 are virtual axes different from each other and disposed in parallel with each other. The vehicle drive apparatus 100 is provided with the transmission mechanism TM (power transmission device) in a power transmission path through which the rotary electric machine MG serving as a power generator is connected to the wheels W. The transmission mechanism TM includes the counter gear mechanism CG and the differential gear mechanism DF disposed in this order from a location adjacent to the rotary electric machine MG.

In the following description, a direction parallel to the axes (A1 to A3) will be referred to as an "axial direction L" of the vehicle drive apparatus 100. A first side in the axial direction L (on which the rotary electric machine MG is disposed relative to the differential gear mechanism DF in the present embodiment) will be referred to as a "first axial side L1", and a second side opposite to the first axial side L1 will be referred to as a "second axial side L2". A direction perpendicular to any one of the first axis A1, the second axis A2, and the third axis A3 will be referred to as a "radial direction R" with reference to the axis. When no distinction is necessary in determining which axis should be used as a reference axis or when it is clear which axis should be used as a reference axis, the radial direction R with reference to the axis may simply be referred to as the "radial direction R". A direction along a vertical direction, with the vehicle drive apparatus 100 installed on a vehicle, will be referred to as a "vertical direction V". In the present embodiment, a first vertical side V1, which corresponds to a first side in the vertical direction V, is the upper side, and a second vertical side V2, which corresponds to a second side in the vertical direction V, is the lower side. When the vehicle drive apparatus 100 is installed on the vehicle such that the vehicle drive apparatus 100 is parallel to a horizontal plane, a direction included in the radial direction R corresponds to the vertical direction V. A direction perpendicular to the axial direction L and the vertical direction V will be referred to as a "front-rear direction H". A first side in the front-rear direction H will be referred to as a "first front-rear side H1". A second side in the front-rear direction H will be referred to as a "second front-rear side H2". A direction included in the radial direction R corresponds to not only the vertical direction V but also the front-rear direction H. In the following description, terms related to, for example, the directions and locations of components conceptually include a state where there is a difference resulting from an error allowable in the course of manufacture. Directions for components indicate directions for the components assembled to the vehicle drive apparatus 100.

As illustrated in FIG. 1, the vehicle drive apparatus 100 includes the case 1 housing the rotary electric machine MG and the differential gear mechanism DF. In the present embodiment, the counter gear mechanism CG is also housed in the case 1. The device housing chamber 5 (first housing chamber) is defined in the case 1. As illustrated in FIG. 1, the device housing chamber 5 includes: a rotary electric machine housing portion 2 housing at least the rotary electric machine MG; and a differential gear housing portion 4 housing the differential gear mechanism DF. The rotary electric machine housing portion 2 includes a first peripheral wall 21 formed to surround the rotary electric machine MG. The differential gear housing portion 4 includes a second peripheral wall 41 formed to surround the differential gear mechanism DF. A connection between the first peripheral wall 21 and the second peripheral wall 41 is provided with a recess 19. Because the rotary electric machine MG and the differential gear mechanism DF are rotary devices, their components are often disposed within a cylindrical space. In the present embodiment, the first peripheral wall 21 has a cylindrical shape surrounding the rotary electric machine housing portion 2, and the second peripheral wall 41 has a cylindrical shape surrounding the differential gear housing portion 4.

The rotary electric machine MG is a rotary electric machine (motor/generator) that operates with a multiphase alternating current (e.g., three-phase alternating current). The rotary electric machine MG is thus able to function not only as an electric motor but also as a generator. As will be described below with reference to FIG. 6, the rotary electric machine MG carries out power running upon receiving supply of electric power from a high-voltage battery BH (high-voltage direct-current power source), or supplies electric power, generated by the inertial force of the vehicle, to the high-voltage battery BH (or carries out regeneration).

Figure 2:
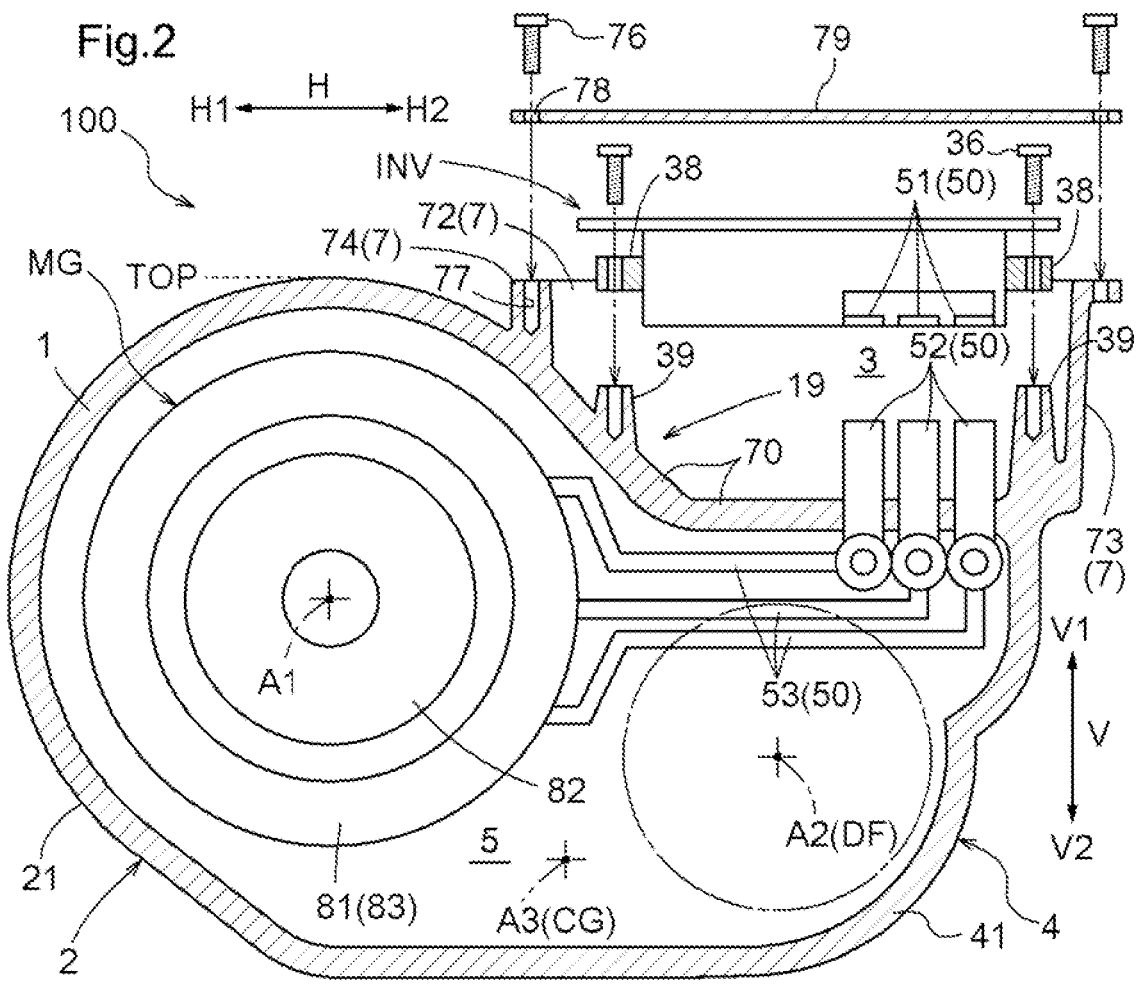
FIG. 2 is a schematic cross-sectional view of the vehicle drive apparatus as viewed in an axial direction.
Figure 6:
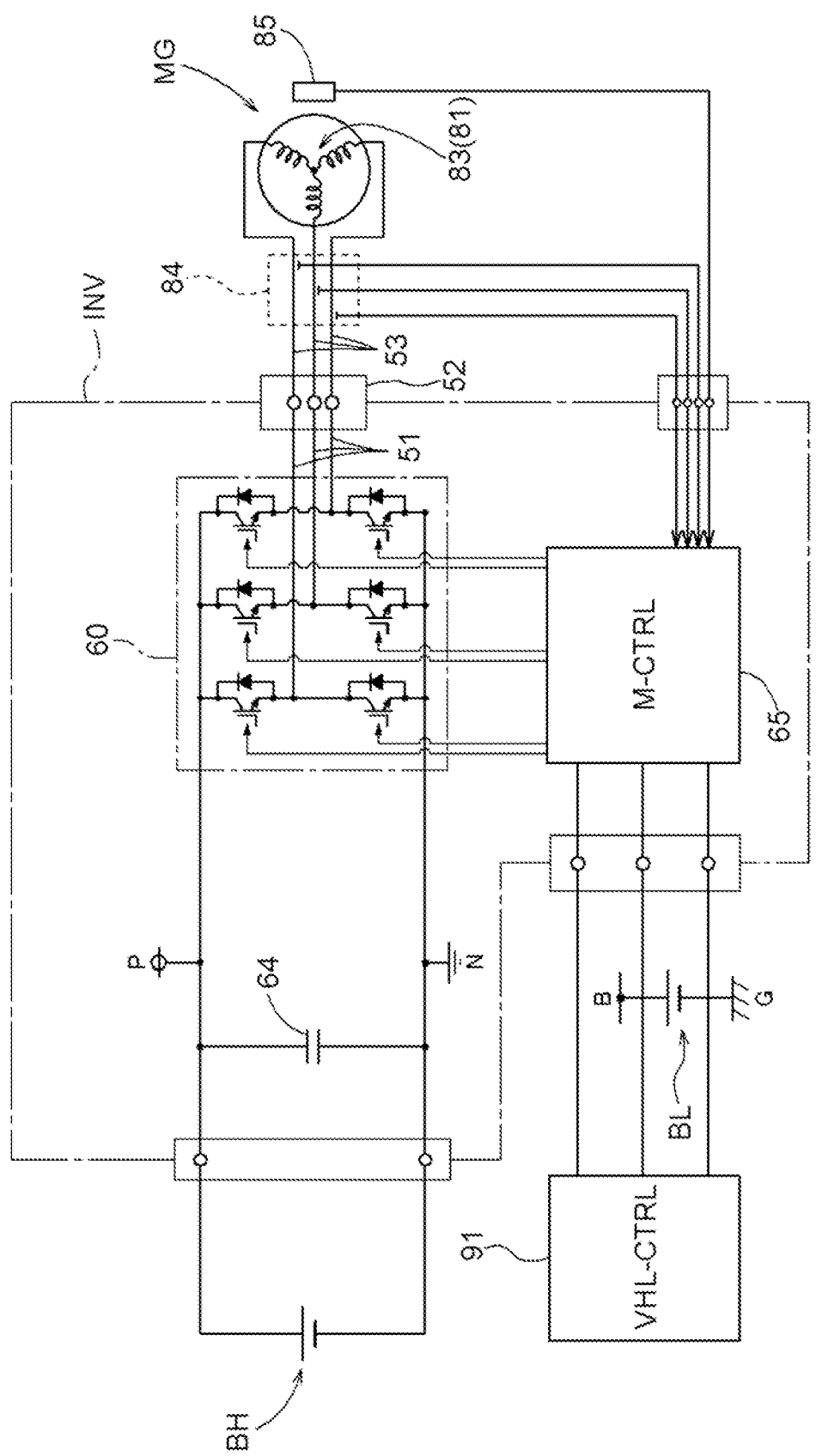
FIG. 6 is a schematic circuit block diagram of an electrical system for driving a rotary electric machine.

As illustrated in FIGS. 2 and 6, the rotary electric machine MG includes: a stator 81 secured to, for example, the case 1; and a rotatably supported rotor 82 located radially inward of the stator 81. The stator 81 includes a stator core and stator coils 83 wound around the stator core. The rotor 82 includes a rotor core and a permanent magnet disposed in the rotor core. The rotor 82 of the rotary electric machine MG is drivingly connected to an input gear G1 (see FIG. 7). The input gear G1 corresponds to a gear on the first axis A1.

The input gear G1 is drivingly connected to the counter gear mechanism CG In the present embodiment, the counter gear mechanism CG includes two gears connected to each other with a shaft member. One of the two gears is a counter driven gear G2 (first gear), and the other one of the two gears is a counter drive gear G3 (second gear). The counter driven gear G2 is in mesh with the input gear G1. The counter drive gear G3 is in mesh with a differential input gear G4 of the differential gear mechanism DF. The differential input gear G4 corresponds to a gear on the second axis A2. The differential gear mechanism DF is drivingly connected to the wheels W through the output members OUT. The differential gear mechanism DF includes a plurality of bevel gears in mesh with each other. The differential gear mechanism DF distributes and transmits rotation and torque, which are input to the differential input gear G4, to the two output members OUT (i.e., the right and left output members OUT) and then to the two wheels W (i.e., the right and left wheels W). The vehicle drive apparatus 100 is thus able to transmit the torque of the rotary electric machine MG to the wheels W so as to cause the vehicle to run.

The transmission mechanism TM includes the differential gear mechanism DF to distribute the driving force, which is transmitted thereto from the rotary electric machine MG, to the pair of wheels W. The output members OUT each transmit the driving force, which is distributed thereto from the differential gear mechanism DF, to an associated one of the pair of wheels W. The transmission mechanism TM includes the counter gear mechanism CG disposed on the third axis A3. The counter gear mechanism CG includes: the counter driven gear G2 serving as the first gear in mesh with the input gear G1, which is a gear on the first axis A1; and the counter drive gear G3 serving as the second gear in mesh with the differential input gear G4, which is a gear on the second axis A2.

As illustrated in FIG. 6, the inverter device INV controls driving of the rotary electric machine MG. In the present embodiment, the inverter device INV is also housed in the case 1 as will be described below with reference to, for example, FIG. 1. The inverter device INV includes an inverter circuit 60 to carry out conversion of electric power between direct-current power and multiphase alternating-current power. The present embodiment illustrates the inverter circuit 60 connected to the alternating-current rotary electric machine MG and the high-voltage battery BH so as to carry out conversion of electric power between multiphase alternating current (which includes three phases, such as U, V, and W phases) and direct current. The inverter circuit 60 includes a plurality of switching elements. The inverter circuit 60 is connected to the high-voltage battery BH and the alternating-current rotary electric machine MG so as to carry out conversion of electric power between direct current and multiphase alternating current (or three-phase alternating current). The high-voltage battery BH includes, for example, a secondary battery (battery), such as a nickel metal hydride battery or a lithium ion battery, and/or an electric double layer capacitor. When the rotary electric machine MG is a vehicle driving force source, the high-voltage battery BH is a high-voltage, high-capacity, direct-current power supply. The rated voltage of the power supply is, for example, between 200 V and 400 V.

The voltage between a positive power supply line P and a negative power supply line N on the direct-current side of the inverter circuit 60 will hereinafter be referred to as a "direct-current link voltage Vdc". A direct-current link capacitor 64 (smoothing capacitor) to smooth the direct-current link voltage Vdc is provided on the direct-current side of the inverter circuit 60. The direct-current link capacitor 64 stabilizes the direct-current voltage (direct-current link voltage Vdc) that changes in accordance with a change in the power consumed by the rotary electric machine MG.

The inverter circuit 60 includes a plurality of arms (or three arms) each including a series circuit of an upper switching element and a lower switching element and each associated with a single alternating-current phase. Power semiconductor elements operable at high frequency are preferably used as the switching elements. Examples of such power semiconductor elements include an insulated gate bipolar transistor (IGBT), a power metal oxide semiconductor field effect transistor (MOSFET), a silicon carbide-metal oxide semiconductor FET (SiC-MOSFET), an SiC-static induction transistor (SiC-SIT), and a gallium nitride-MOSFET (GaN-MOSFET). As illustrated in FIG. 6, the present embodiment illustrates a mode in which IGBTs are used as the switching elements. In the present embodiment, the elements of the inverter circuit 60, including freewheel diodes, are integrated into a single power module, thus providing a switching element module.

As illustrated in FIG. 6, the inverter circuit 60 is controlled by an inverter controller 65 (M-CTRL). The inverter controller 65 is created using, as its core component, a logic circuit, such as a microcomputer. In accordance with a target torque for the rotary electric machine MG, the inverter controller 65 exercises current feedback control that involves using a vector control method, thus controlling the rotary electric machine MG through the inverter circuit 60. The target torque for the rotary electric machine MG is provided in the form of a request signal from, for example, the other controller, such as a vehicle controller 91 (VCL-CTRL) that is one of upper controllers in the vehicle. The actual currents flowing through the stator coils 83 for the respective phases of the rotary electric machine MG are detected by a current sensor 84. The magnetic pole position of the rotor of the rotary electric machine MG at each point in time is detected by a rotation sensor 85, such as a resolver, for example.

The inverter controller 65 carries out current feedback control using detection results obtained by the current sensor 84 and the rotation sensor 85. The inverter controller 65 includes various functional parts for current feedback control. The functional parts are implemented by cooperation between hardware, such as a microcomputer, and software (program). Current feedback control is known in the art and will thus not be described in detail.

The vehicle controller 91 and the microcomputer, serving as the core of the inverter controller 65, operate at a voltage of, for example, 5 V or 3.3 V. The vehicle controller 91 and the inverter controller 65 are low-voltage circuits that operate upon receiving electric power from a low-voltage battery BL (low-voltage direct-current power supply) such as one illustrated in FIG. 6. The low-voltage battery BL is a power supply whose voltage is lower than that of the high-voltage battery BH (e.g., a voltage of between 12 V and 24 V). Accordingly, the inverter controller 65 includes a drive circuit to enhance the driving capability (e.g., a capability to operate a circuit at a subsequent stage, such as voltage amplitude or output current) of a switching control signal for each switching element (which is a gate drive signal when each switching element is an IGBT) and relay the resulting switching control signal. Control terminals for the switching elements (e.g., gate terminals for IGBTs) included in the inverter circuit 60 are connected through the drive circuit to, for example, the microcomputer serving as the core of the inverter controller 65 and are individually subjected to switching control. The inverter controller 65 is provided by mounting its circuit components on a single substrate or a plurality of substrates.

The inverter device INV is provided in the form of a unit including the inverter controller 65, the direct-current link capacitor 64, and the inverter circuit 60 (power module) described above. The inverter device INV in the form of the unit is disposed in the inverter housing chamber 3 (second housing chamber) within the case 1 and secured to the case 1 with fastening members, such as bolts, as will be described below. FIG. 6 illustrates a mode in which the current sensor 84 detects currents flowing through rotary electric machine side alternating-current bus bars 53 connecting the inverter device INV to the rotary electric machine MG. The current sensor 84 is disposed separately from the inverter device INV. Alternatively, the current sensor 84 may be disposed in the inverter device INV and may thus detect currents flowing through inverter side alternating-current bus bars 51. The current sensor 84 may be disposed in each or any one of alternating-current bus bar connectors 52 connecting the inverter side alternating-current bus bars 51 to the rotary electric machine side alternating-current bus bars 53 and may thus detect alternating currents flowing therethrough.

Figure 3:
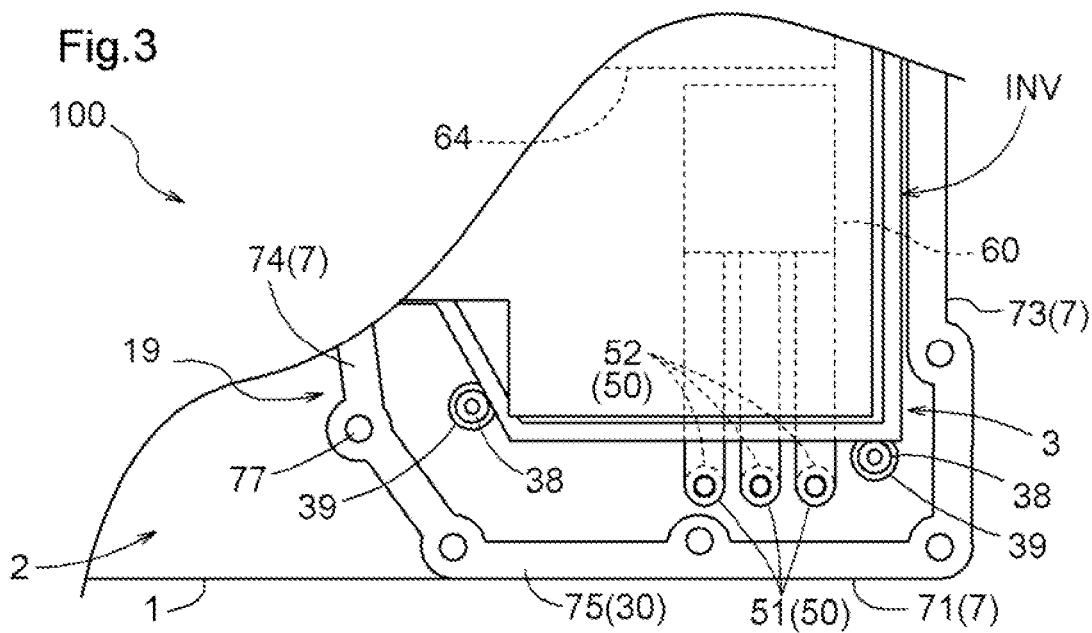
FIG. 3 is a schematic enlarged plan view of an inverter housing chamber.

In the present embodiment, the inverter device INV is also housed in the case 1. Specifically, as illustrated in FIGS. 1 to 3, the inverter device INV is disposed in the inverter housing chamber 3 defined adjacent to the recess 19. The case 1 includes a rib 7 (side wall) which is formed to extend on opposite sides of the recess 19 in a direction along a virtual plane QP (see FIG. 1) perpendicular to the axial direction L, and through which the first peripheral wall 21 and the second peripheral wall 41 are connected to each other. At least a portion of a housing wall 30 surrounding the inverter housing chamber 3 is defined by the rib 7.

As illustrated in FIG. 2, application of external force, such as vibrations, to the case 1 is likely to increase stress on the recess 19 defined in the connection between the cylindrical first peripheral wall 21 and the cylindrical second peripheral wall 41. Providing the rib 7 such that the rib 7 extends on opposite sides of the recess 19 in the direction along the virtual plane QP perpendicular to the axial direction L as in the present embodiment, however, enables reinforcement of the recess 19 so as to increase the rigidity of the case 1 to withstand such stress.

The rib 7 defines a portion of the housing wall 30 of the inverter housing chamber 3. This enables reinforcement of the case 1 while preventing the rib 7 from increasing the size of the vehicle drive apparatus 100 including the inverter device INV. The inverter housing chamber 3 is integral with the rotary electric machine housing portion 2 and the differential gear housing portion 4 so as to provide the single case 1. Accordingly, unlike when the inverter housing chamber 3 is secured to the rotary electric machine housing portion 2 and the differential gear housing portion 4 with, for example, fastening members, the present embodiment does not need any structure for increasing the rigidity of securer(s) to secure the inverter housing chamber 3 to the rotary electric machine housing portion 2 and the differential gear housing portion 4, and thus prevents an increase in the size of the vehicle drive apparatus 100 caused by such a structure.

For example, if a vehicle drive apparatus has a "direct installation structure" in which an inverter case is installed on the outer portion of a drive device case as described in Patent Document 1, a bottom wall of the inverter case (which is a wall facing the drive device case) vibrates, which is likely to produce noise resulting from spatial resonance. When the inverter housing chamber 3, the rotary electric machine housing portion 2, and the differential gear housing portion 4 are integral with each other so as to provide the single case 1 as in the present embodiment, however, the inverter housing chamber 3 does not have to be provided with any bottom wall. The present embodiment is thus able to prevent vibrations of such a bottom wall, which produces noise resulting from spatial resonance.

Figure 4:
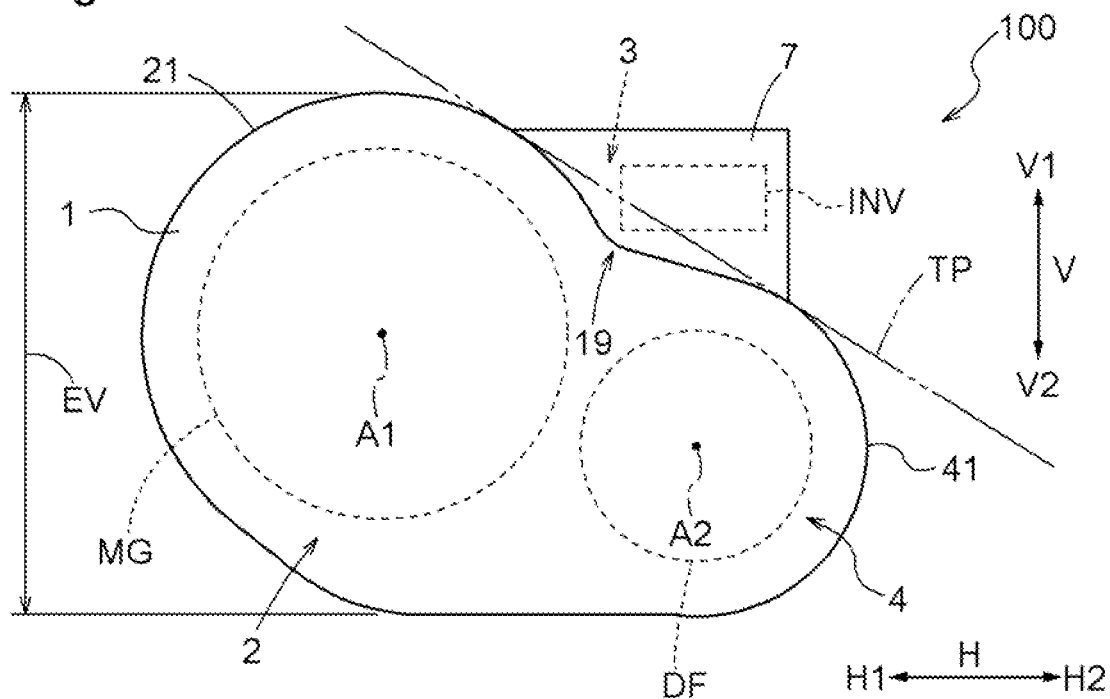
FIG. 4 is a conceptual diagram illustrating a relationship between a rotary electric machine housing portion and the inverter housing chamber as viewed in the axial direction.

As illustrated in FIG. 4, which is a conceptual diagram illustrating a relationship between the rotary electric machine housing portion 2 and the inverter housing chamber 3 as viewed in the axial direction, the rib 7 has a wall shape extending along a plane intersecting a tangential plane TP tangent to both of the outer surface of the first peripheral wall 21 and the outer surface of the second peripheral wall 41. In the present embodiment, the rib 7 has a wall shape extending along the virtual plane QP perpendicular to the axial direction L as illustrated in FIG. 1. As illustrated in, for example, FIG. 1, the recess 19 extends along the axial direction L. Because the rib 7 has a wall shape extending along the virtual plane QP perpendicular to the axial direction L, stress transmitted to the recess 19 is suitably received by the rib 7 between the first peripheral wall 21 and the second peripheral wall 41, making it possible to reduce stress applied to the recess 19.

To house the rotary electric machine MG in the rotary electric machine housing portion 2, the case 1 is provided with a first opening 11 (opening) defined on the first axial side L1 relative to the rotary electric machine housing portion 2. In the present embodiment, the first opening 11 is defined in a portion of the case 1 on the first axial side L 1 such that the first opening 11 is integral with an opening through which the differential gear mechanism DF and the counter gear mechanism CG are to be housed in the case 1. As illustrated in FIG. 1, the rib 7 (or a first rib 71) is disposed on the first axial side L1 relative to the center of the case 1 in the axial direction L.

Providing the rib 7 (or the first rib 71) at a location close to the first opening 11 in the axial direction L as described above enables the rib 7 to compensate for a reduction in the rigidity of the case 1 caused by the opening. Disposing the rib 7 (or the first rib 71) on one side relative to the center of the case 1 in the axial direction L facilitates allowing the inverter housing chamber 3 to have a sufficient volumetric capacity while using the rib 7 as a portion of the housing wall 30 of the inverter housing chamber 3.

The present embodiment further involves disposing the rib 7 (or a second rib 72) on the second axial side L2 relative to the center of the case 1 in the axial direction L. As illustrated in FIG. 1, the rib 7 in the present embodiment includes: the first rib 71 disposed on the first axial side L1 relative to the inverter housing chamber 3; and the second rib 72 disposed on the second axial side L2 relative to the inverter housing chamber 3. A portion of the housing wall 30 disposed on the first axial side L1 relative to the inverter housing chamber 3 is at least partially defined by the first rib 71. A portion of the housing wall 30 disposed on the second axial side L2 relative to the inverter housing chamber 3 is at least partially defined by the second rib 72.

The first rib 71 and the second rib 72 are provided at different locations in the axial direction L such that the first rib 71 and the second rib 72 both define a portion of the housing wall 30 of the inverter housing chamber 3. Accordingly, the present embodiment is able to further increase the rigidity of the case 1 with the first rib 71 and the second rib 72 and to suitably create the inverter housing chamber 3 using a space between the first rib 71 and the second rib 72.

As illustrated in FIG. 1, the case 1 further includes a connecting rib 73 formed to extend in the axial direction L such that an end (first end 71b) of the first rib 71 located opposite to the first peripheral wall 21 relative to the recess 19 is connected to an end (second end 72b) of the second rib 72 located opposite to the first peripheral wall 21 relative to the recess 19. A portion of the housing wall 30 extending in the axial direction L is at least partially defined by the connecting rib 73. The housing wall 30 surrounding the inverter housing chamber 3 includes the first rib 71, the second rib 72, and the connecting rib 73. Because the ends of the first rib 71 and the second rib 72 are connected to each other with the connecting rib 73, the present embodiment is able to further increase the rigidity of the case 1. The inverter housing chamber 3 is suitably defined in a space surrounded by the first rib 71, the second rib 72, and the connecting rib 73. In the present embodiment, the case 1 further includes an auxiliary connecting rib 74 formed to extend in the axial direction L such that an end of the first rib 71 located closer to the first peripheral wall 21 relative to the recess 19 is connected to an end of the second rib 72 located closer to the first peripheral wall 21 relative to the recess 19. A portion of the inverter housing chamber 3 located opposite to the connecting rib 73 is surrounded by the auxiliary connecting rib 74 and the first peripheral wall 21.

As illustrated in FIGS. 1 to 3, securers 39 to secure the inverter device INV are provided in a region surrounded by the housing wall 30 on an outer wall of the case 1. The inverter device INV provided in the form of a single unit including the direct-current link capacitor 64 and the inverter circuit 60 (power module) includes a bracket 37 to secure these components. The bracket 37 is provided with inverter securers 38 to secure the inverter device INV to the securers 39. The inverter securers 38 are secured to the securers 39 with inverter fastening members 36, such as screws. The inverter device INV is secured within the region surrounded by the housing wall 30 and thus housed in the inverter housing chamber 3.

As illustrated in FIG. 2, the three-phase rotary electric machine side alternating-current bus bars 53, each connected to an associated one of the three-phase stator coils 83 of the rotary electric machine MG, extend from the rotary electric machine housing portion 2 to the differential gear housing portion 4 inside the case 1. The alternating-current bus bar connectors 52 (alternating-current bus bar connecting members) are disposed between the differential gear housing portion 4 and the inverter housing chamber 3 such that the alternating-current bus bar connectors 52 pass through the case 1. Portions of the alternating-current bus bar connectors 52 passing through the case 1 are disposed inside the inverter housing chamber 3, so that first ends of the alternating-current bus bar connectors 52 are located inside the inverter housing chamber 3. As illustrated in FIG. 3, the first ends of the alternating-current bus bar connectors 52 are electrically connected to the inverter side alternating-current bus bars 51 inside the inverter housing chamber 3. Wiring (alternating-current power lines 50) electrically connects the rotary electric machine MG to the inverter device INV installed in the inverter housing chamber 3. A connection through which the wiring passes is also allowed to be disposed within the region surrounded by the housing wall 30, making it possible to simplify a sealing structure for the connection. The alternating-current power lines 50 include the inverter side alternating-current bus bars 51, the alternating-current bus bar connectors 52, and the rotary electric machine side alternating-current bus bars 53.

As illustrated in FIGS. 1 to 3, the peripheral edge of the housing wall 30 is provided with an abutment portion 75 in abutment with a cover member 79. The abutment portion 75 is provided with cover securers 77 to secure the cover member 79 covering the inverter housing chamber 3. The cover member 79 is provided with through holes 78. The cover member 79 is secured to the cover securers 77 with cover fastening members 76, such as screws, passing through the through holes 78. A sealing member is disposed between the cover member 79 and the abutment portion 75 so as to seal the internal space of the inverter housing chamber 3 from the external space of the case 1.

Figure 8:
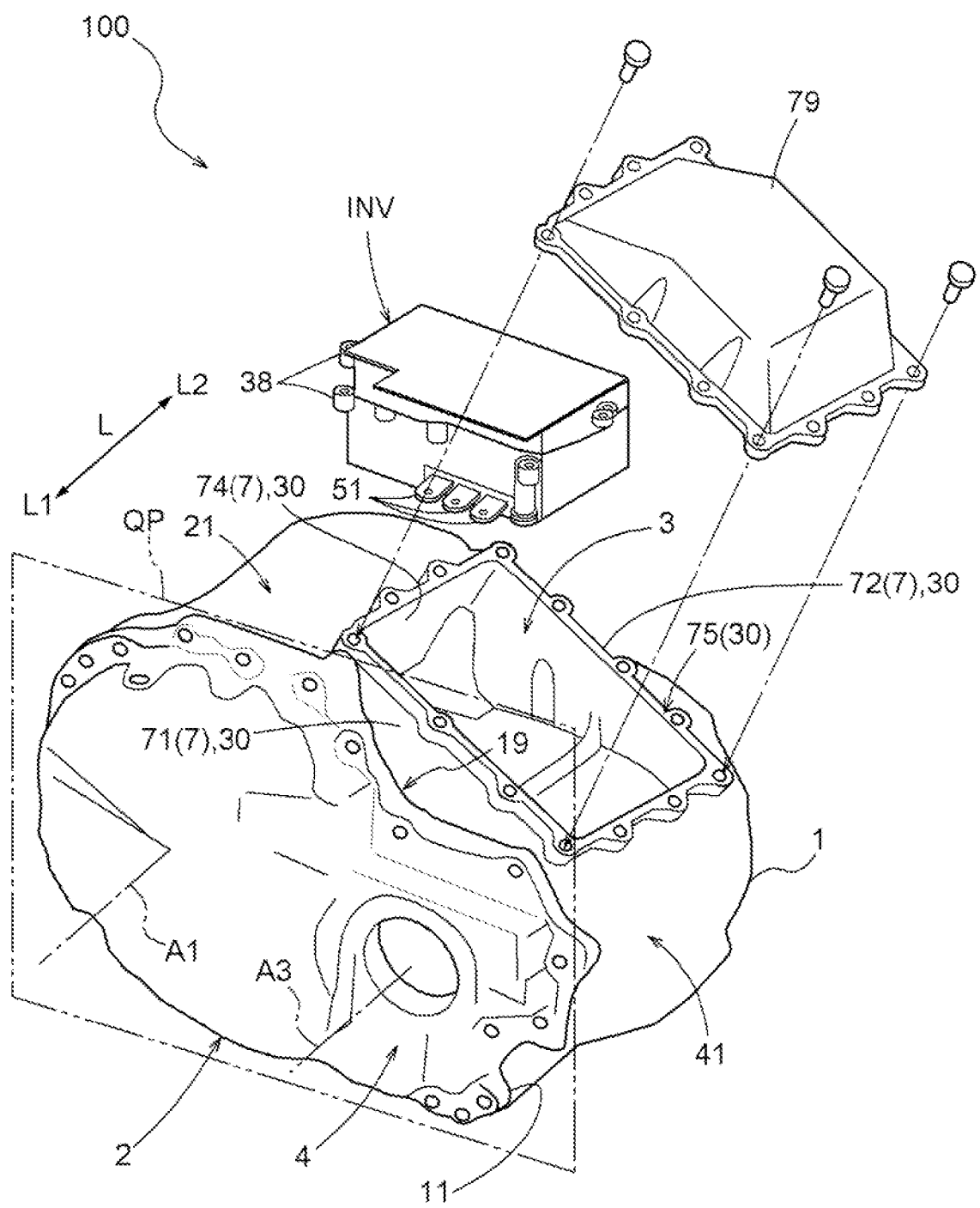
FIG. 8 is an exploded perspective view of another exemplary vehicle drive apparatus.

The above description has illustrated, with reference to, for example, FIG 1, the mode in which the rib 7 includes the first rib 71, the second rib 72, and the connecting rib 73, and the housing wall 30 surrounding the inverter housing chamber 3 includes the first rib 71, the second rib 72, and the connecting rib 73. Alternatively, as illustrated in FIG. 8, for example, the rib 7 may include no connecting rib 73, and the housing wall 30 surrounding the inverter housing chamber 3 may include the first rib 71 and the second rib 72. In this example, the housing wall 30 further includes the auxiliary connecting rib 74. In this case, the abutment portion 75 provided on the peripheral edge of the housing wall 30 and in abutment with the cover member 79 is disposed obliquely relative to the horizontal plane such that the abutment portion 75 extends along the tangential plane TP tangent to both of the outer surface of the first peripheral wall 21 and the outer surface of the second peripheral wall 41. Also in this example, the rib 7 (which includes the first rib 71 and the second rib 72) has a wall shape extending along a plane intersecting the tangential plane TP as illustrated in FIG. 8. When the housing wall 30 includes no connecting rib 73, a portion of the housing wall 30 corresponding to the connecting rib 73 is preferably provided on the cover member 79 as illustrated in FIG. 8.

Figure 9:
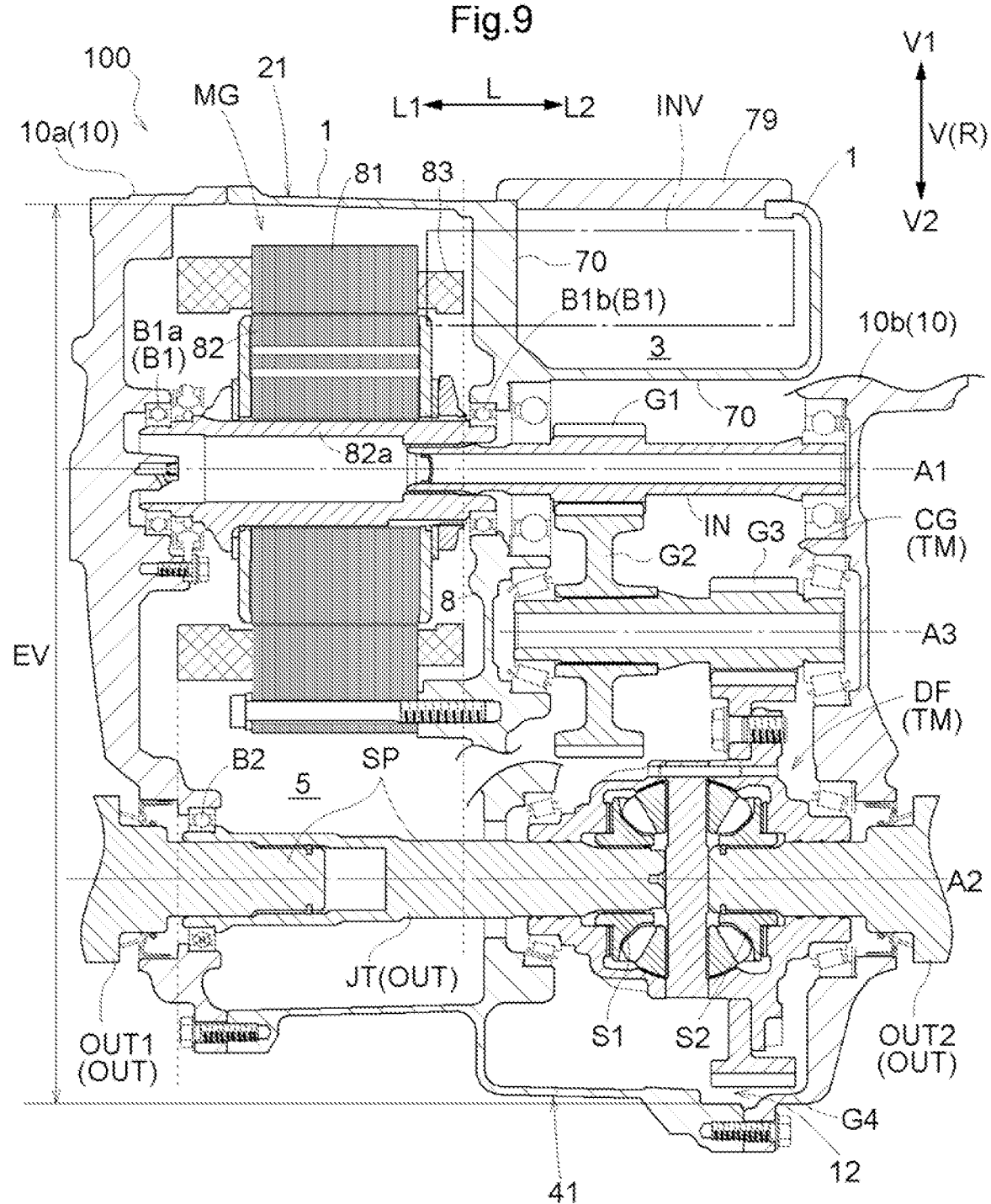
FIG. 9 is a cross-sectional view of the vehicle drive apparatus in an axial direction.
Figure 10:
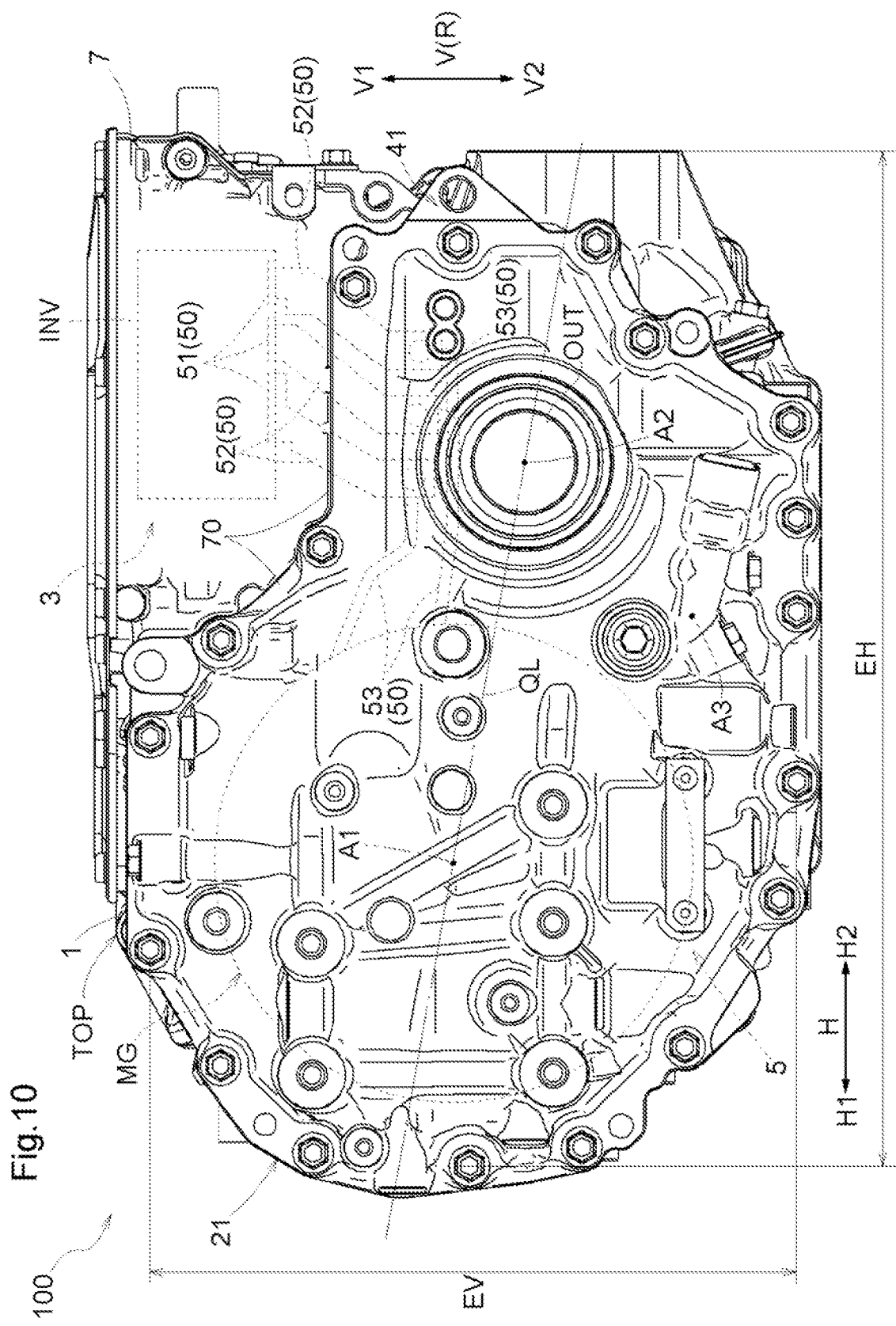
FIG. 10 is a cross-sectional view of the vehicle drive apparatus in a direction perpendicular to the axial direction.
Figure 11:
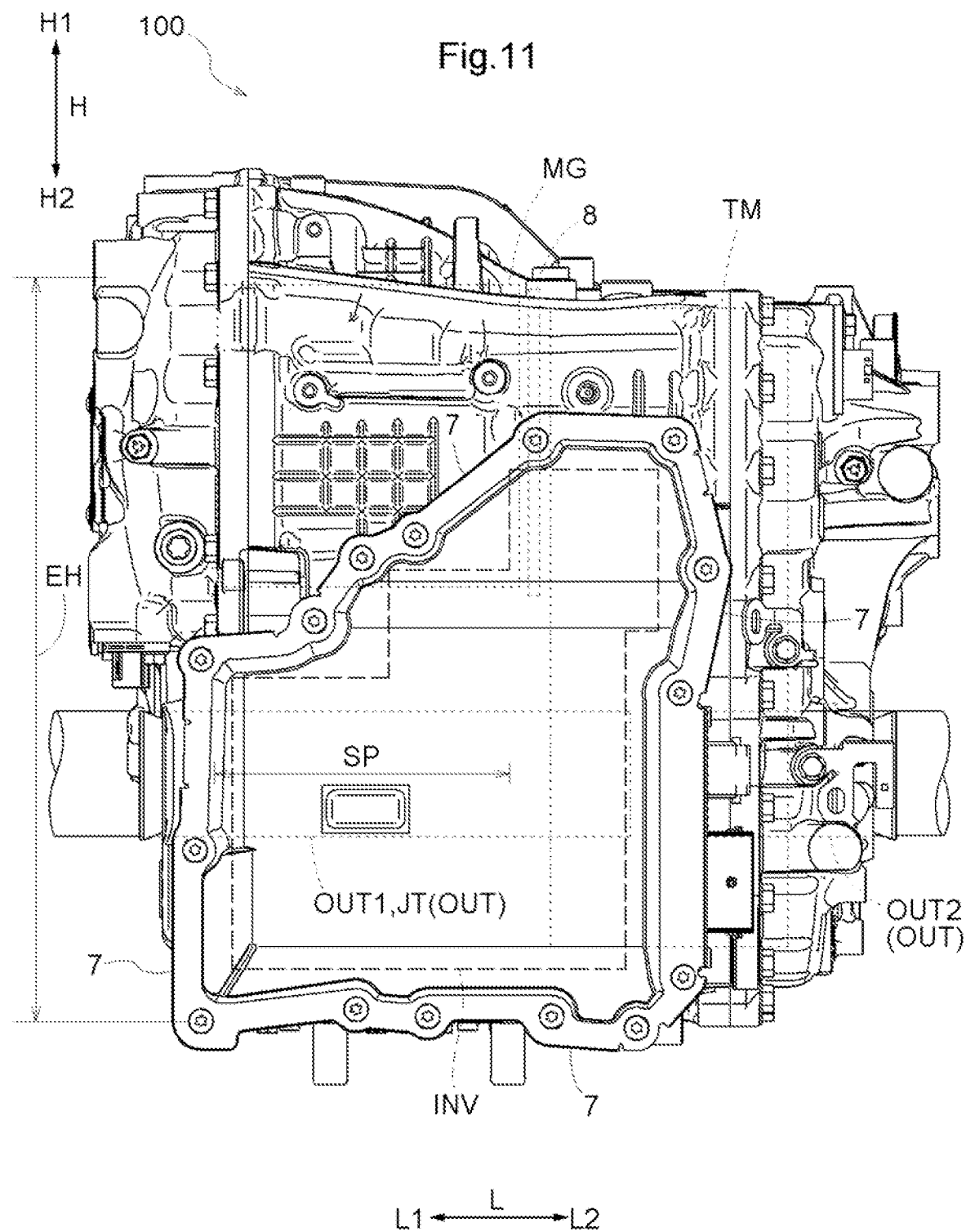
FIG. 11 is a plan view of the vehicle drive apparatus as viewed from a first vertical side.

The following description illustrates this structure in more detail. In the following description, components similar to those in the above description will be identified by the same reference signs. FIG. 9 is a cross-sectional view of the vehicle drive apparatus 100 in an axial direction. FIG. 10 is a cross-sectional view of the vehicle drive apparatus 100 in a direction perpendicular to the axial direction. FIG. 11 is a plan view of the vehicle drive apparatus 100 as viewed from the first vertical side V1.

As described above with reference to, for example, FIG. 1, the vehicle drive apparatus 100 includes: the rotary electric machine MG disposed on the first axis A1; the output members OUT disposed on the second axis A2; the transmission mechanism TM; the inverter device INV; and the case 1. The case 1 is a single-piece case internally including: the device housing chamber 5 (first housing chamber) housing the rotary electric machine MG and at least a portion of each output member OUT; and the inverter housing chamber 3 (second housing chamber) housing the inverter device INV and divided from the device housing chamber 5 with the partition 70. As mentioned above, the term "single-piece" refers to a single-piece component provided in the form of, for example, a single die-cast product using similar materials. The first axis A1 and the second axis A2 are different axes parallel to each other. As illustrated in FIG. 9, the inverter device INV is disposed to overlap with the output members OUT in a vertical view along the vertical direction V.

As viewed in the axial direction L, at least a portion of the inverter device INV is disposed on the same side as the output members OUT relative to the first axis A1 or disposed on the second front-rear side H2 (see FIG. 10). At least a specified portion SP (see FIG. 9) of the output member OUT, which is a portion whose location in the axial direction L overlaps with the rotary electric machine MG, is housed in the device housing chamber 5. The partition 70 is provided between the specified portion SP and the inverter device INV.

The single-piece case 1 internally including the device housing chamber 5 and the inverter housing chamber 3 is higher in rigidity than a case 1 including a device housing chamber 5 and an inverter housing chamber 3 that are separate components assembled to the case 1. Unlike when the two housing chambers are separate components, this embodiment enables sharing of the partition 70 dividing the device housing chamber 5 from the inverter housing chamber 3, leading to a reduction in the weight of the case 1. The device housing chamber 5 houses both of: the rotary electric machine MG serving as the driving force source for the wheels W; and the output members OUT drivingly connected to the wheels W. This enables the first axis A1 and the second axis A2 to be easily disposed close to each other. Accordingly, this embodiment is able to reduce the size of the vehicle drive apparatus 100. The location of the inverter device INV in the single-piece case 1 overlaps with the output members OUT in the vertical view. Consequently, this embodiment facilitates preventing expansion of the inverter housing chamber 3 in the vertical direction V aimed at increasing the volumetric capacity of the inverter housing chamber 3 housing the inverter device INV.

As previously described, at least a portion of the inverter device INV is disposed on the same side as the output members OUT relative to the first axis A1. The partition 70 is provided between the specified portion SP and the inverter device INV. Accordingly, the location of the inverter device INV in the single-piece case 1 is easily overlapped with the output members OUT in the radial direction R. This also facilitates preventing expansion of the inverter housing chamber 3 in the vertical direction V aimed at increasing the volumetric capacity of the inverter housing chamber 3 housing the inverter device INV.

As illustrated in FIGS. 9 to 11, the partition 70 dividing the device housing chamber 5 from the inverter housing chamber 3 is disposed to overlap with the specified portion SP and the inverter device INV as viewed in the radial direction R of the output members OUT (which substantially corresponds to the vertical direction V). Disposing the partition 70 such that the partition 70 overlaps with the specified portion SP and the inverter device INV facilitates overlapping of the location of the inverter device INV in the single-piece case 1 with the output members OUT in the radial direction R, and thus facilitates preventing the inverter housing chamber 3, which houses the inverter device INV, from expanding in the vertical direction V.

As illustrated in FIG. 10, the partition 70 dividing the device housing chamber 5 from the inverter housing chamber 3 is disposed between the inverter device INV and the output members OUT. In the vertical view, the output members OUT housed in the device housing chamber 5 overlap with the inverter device INV housed in the inverter housing chamber 3. Disposing the partition 70, which divides the device housing chamber 5 from the inverter housing chamber 3, between the inverter device INV and the output members OUT makes it possible to prevent the single-piece case 1, internally including the device housing chamber 5 and the inverter housing chamber 3, from increasing in dimension in the vertical direction V.

As illustrated in FIG. 10, the partition 70 dividing the device housing chamber 5 from the inverter housing chamber 3 is disposed not only between the inverter device INV and the output members OUT but also between the inverter device INV and the rotary electric machine MG. Disposing the partition 70 not only between the inverter device INV and the output members OUT but also between the inverter device INV and the rotary electric machine MG enables an increase in the volumetric capacity of the inverter housing chamber 3. Consequently, this embodiment is able to prevent the case 1 from increasing in dimension in the vertical direction V, making the vehicle drive apparatus 100 smaller in size.

The case 1 includes: the first peripheral wall 21 formed to surround the rotary electric machine MG and connected to the partition 70; and the second peripheral wall 41 formed to surround the output members OUT and connected to the partition 70. Providing the partition 70 serving as portions of the first peripheral wall 21 and the second peripheral wall 41 prevents the case 1 from increasing in size and thus prevents the vehicle drive apparatus 100 from increasing in scale. Lower portions of the partition 70 in the vertical direction V are connected to the first peripheral wall 21 and the second peripheral wall 41. The second peripheral wall 41 and the partition 70 are connected to the partition 70 on the opposite side of the first axis A1 in the front-rear direction H relative to the second axis A2.

The first peripheral wall 21 includes a portion (which is the recess 19) extending below a top portion TOP (see FIGS. 2 and 10) along the circumferential direction of the rotary electric machine MG. In other words, the partition 70 includes an extension (which is the recess 19) extending toward an upper portion of the device housing chamber 5 (which is the top portion TOP) along the circumferential direction of the rotary electric machine MG, and the extension (which is the recess 19) is connected to the device housing chamber 5. The first peripheral wall 21 and the second peripheral wall 41 differ in diameter. For example, when the first peripheral wall 21 is larger in diameter than the second peripheral wall 41, the connection (which is the recess 19) between the first peripheral wall 21 and the second peripheral wall 41 is formed to extend below the top portion TOP along the circumferential direction of the rotary electric machine MG. Although a space adjacent to this portion (which is the recess 19) is likely to be a dead space, this space is usable as an installation space for the inverter housing chamber 3.

The case 1 includes the rib 7 (side wall) extending from the partition 70 and the first peripheral wall 21 and formed to surround the inverter device INV. The rib 7 (side wall) facilitates providing the inverter housing chamber 3 housing the inverter device INV. The first peripheral wall 21 including the portion (i.e., the recess 19) extending below the top portion. TOP along the circumferential direction of the rotary electric machine MG allows suitable placement of the inverter housing chamber 3 with the use of a space that may be a dead space, and enables an increase in the rigidity of the case 1.

The rib 7 (side wall) may be formed to extend from the partition 70 and surround the inverter device INV. The rib 7 (side wall) thus formed makes it possible to suitably provide the inverter housing chamber 3 housing the inverter device INV.

As illustrated in FIG. 10, the alternating-current power lines 50 connecting the rotary electric machine MG to the inverter device INV are disposed between the partition 70 and the output members OUT. The rotary electric machine MG and the output members OUT are housed in the device housing chamber 5 defined in the single-piece case 1, so that an empty space is easily provided in the device housing chamber 5. Disposing the alternating-current power lines 50 in such an empty space prevents the vehicle drive apparatus 100 from increasing in size while leaving a wiring space. The partition 70 divides the device housing chamber 5, which houses the rotary electric machine MG, from the inverter housing chamber 3, which houses the inverter device INV. In other words, the device housing chamber 5 and the inverter housing chamber 3 are adjacent to each other, with the single shared partition 70 interposed therebetween. The inverter device INV overlaps with the output members OUT in the vertical view. Accordingly, disposing the alternating-current power lines 50 between the partition 70 and the output members OUT enables the alternating-current power lines 50 to suitably make an electric connection between the rotary electric machine MG and the inverter device INV at a short distance.

The transmission mechanism TM includes the differential gear mechanism DF to distribute the driving force, which is transmitted thereto from the rotary electric machine MG, to the pair of wheels W. The output members OUT each transmit the driving force, which is distributed thereto from the differential gear mechanism DF, to an associated one of the pair of wheels W. The output member OUT disposed on the first axial side L1 will be referred to as a "first output member OUT1". The output member OUT disposed on the second axial side L2 will be referred to as a "second output member OUT2". The first output member OUT1 is connected to the differential gear mechanism DF through a connecting shaft JT. The connecting shaft JT is also included in the output members OUT. The output members OUT thus include the first output member OUT1, the second output member OUT2, and the connecting shaft JT. As illustrated in FIG. 9, the output members OUT extend out of the case 1. At least a portion of the output member OUT (or portions of the first output member OUT1 and the connecting shaft JT), whose location in the axial direction L overlaps with the rotary electric machine MG, is housed in the device housing chamber 5. In the mode illustrated in FIG. 9, a portion of the second output member OUT2 is also housed in the device housing chamber 5.

The vehicle drive apparatus 100 includes: a body cover 10 (first cover) covering the device housing chamber 5; and the cover member 79 (second cover) covering the inverter housing chamber 3. A drive apparatus case containing the rotary electric machine MG, the transmission mechanism TM, and the inverter device INV is defined by: the case 1 serving as a body case; a first body cover 10a covering the first opening 11 of the case 1 located on the first axial side L1; a second body cover 10b covering a second opening 12 of the case 1 located on the second axial side L2; and the cover member 79. The body cover 10 includes the first body cover 10a and the second body cover 10b. Accordingly, the first body cover 10a and the second body cover 10b also correspond to the first cover.

Because the body cover 10 covers the device housing chamber 5 housing the rotary electric machine MG, the rotary electric machine MG is easily touchable from outside the case 1, with the body cover 10 not attached to the case 1. The alternating-current power lines 50 are thus easily attachable to the rotary electric machine MG from outside the case 1. Because the cover member 79 covers the inverter housing chamber 3 housing the inverter device INV, the inverter device INV is easily touchable from outside the case 1, with the cover member 79 not attached to the case 1. The alternating-current power lines 50 are thus easily attachable to the inverter device INV from outside the case 1. This facilitates electrically connecting the inverter device INV to the rotary electric machine MG through the alternating-current power lines 50, resulting in improved productivity.

Connection of the alternating-current power lines 50 may involve providing an operation opening (which may be referred to as a "service hole" or "maintenance hole", for example) in the case 1. The present embodiment, however, is able to make connection of the alternating-current power lines 50 from both of a location adjacent to the body cover 10 and a location adjacent to the cover member 79, which eliminates the need to provide such an opening. Accordingly, the present embodiment is able to reduce the manufacturing cost of the case 1 and prevent a reduction in the rigidity of the case 1 caused by such an opening.

The device housing chamber 5 houses: first bearings B1 supporting the rotary electric machine MG such that the rotary electric machine MG is rotatable; and a second bearing B2 supporting the output member OUT (or the first output member OUT1) such that the output member OUT is rotatable. The second bearing B2 is supported by the first body cover 10a. The first output member OUT1 is supported by the second bearing B2 on the first axial side L1 and is connected to the connecting shaft JT on the second axial side L2. The connecting shaft JT is connected to a first side gear S1 of the differential gear mechanism DF on the second axial side L2. The second output member OUT2 is connected to a second side gear S2 of the differential gear mechanism DF on the first axial side. The first bearings B1 and the second bearing B2 are housed in the same device housing chamber 5 and may thus be lubricated with the same oil. Naturally, the first side gear S1 and the second side gear S2 are included in the differential gear mechanism DF but not included in the output members OUT.

The rotary electric machine MG includes a rotor shaft 82a supported by the first bearings B1 on both of the first axial side L1 and the second axial side L2 such that the rotor shaft 82a is rotatable. The first bearing B1 on the first axial side L1 will hereinafter be referred to as a "first rotor bearing B1a". The first bearing B1 on the second axial side L2 will hereinafter be referred to as a "second rotor bearing B1b". Similarly to the second bearing B2, the first rotor bearing B1a is supported by the first body cover 10a. The second rotor bearing B1b is supported by a support wall 8 (which will be described below). As illustrated in FIG. 9, the support wall 8 is integral with the case 1 and extends in a direction perpendicular to the axial direction L.

Because the first bearing B1 (or the first rotor bearing B1a) and the second bearing B2 are attached to the first body cover 10a (first cover), this embodiment is able to support the rotary electric machine MG and the output member OUT at locations adjacent to an end of the case 1 on the first axial side L1 in the axial direction L, and to prevent the vehicle drive apparatus 100 from increasing in scale. A sealing member to seal a through hole for the output member OUT is attached to the body cover 10 (first cover).

The rotor shaft 82a of the rotary electric machine MG is connected to an input member IN and rotates together with the input member IN. The input member IN is provided with the input gear 01. The input member IN is rotatably supported by the support wall 8 through a bearing on the first axial side L1 and rotatably supported by the second body cover 10b through a bearing on the second axial side. No reference signs are given to these bearings in FIG. 9. Similarly, the counter gear mechanism CG is also rotatably supported by the support wall 8 through a bearing on the first axial side L1 and rotatably supported by the second body cover 10b through a bearing on the second axial side. The differential gear mechanism DF is also rotatably supported by the support wall 8 through a bearing on the first axial side L1 and rotatably supported by the second body cover 10b through a bearing on the second axial side. Thus, providing the device housing chamber 5 with the support wall 8 enables the rotary electric machine MG and the transmission mechanism TM to be suitably housed in the device housing chamber 5, while preventing the case 1 from increasing in size.

Although described above with reference to, for example, FIGS. 2 and 7, the transmission mechanism TM includes the counter gear mechanism CG disposed on the third axis A3 different from and parallel to the first axis A1 and the second axis A2 as also illustrated in FIG. 9. The counter gear mechanism CG includes: the counter driven gear G2 (first gear) in mesh with the gear on the first axis A1 (which is the input gear G1); and the counter drive gear G3 (second gear) in mesh with the gear on the second axis A2 (which is the differential input gear G4). As illustrated in FIG. 9, the counter driven gear G2 (first gear) is disposed closer to the rotary electric machine MG than the counter drive gear G3 (second gear) in the axial direction L. As illustrated in FIGS. 2 and 10, the third axis A3 is disposed below a virtual line QL in the vertical direction V. The virtual line QL connects the first axis A1 with the second axis A2. As illustrated in FIG. 9, the inverter device INV is located on the first vertical side V1 relative to (or located above) the counter driven gear G2 (first gear) in the vertical direction V, and is disposed to overlap with the counter driven gear G2 in the vertical view.

Figure 7:
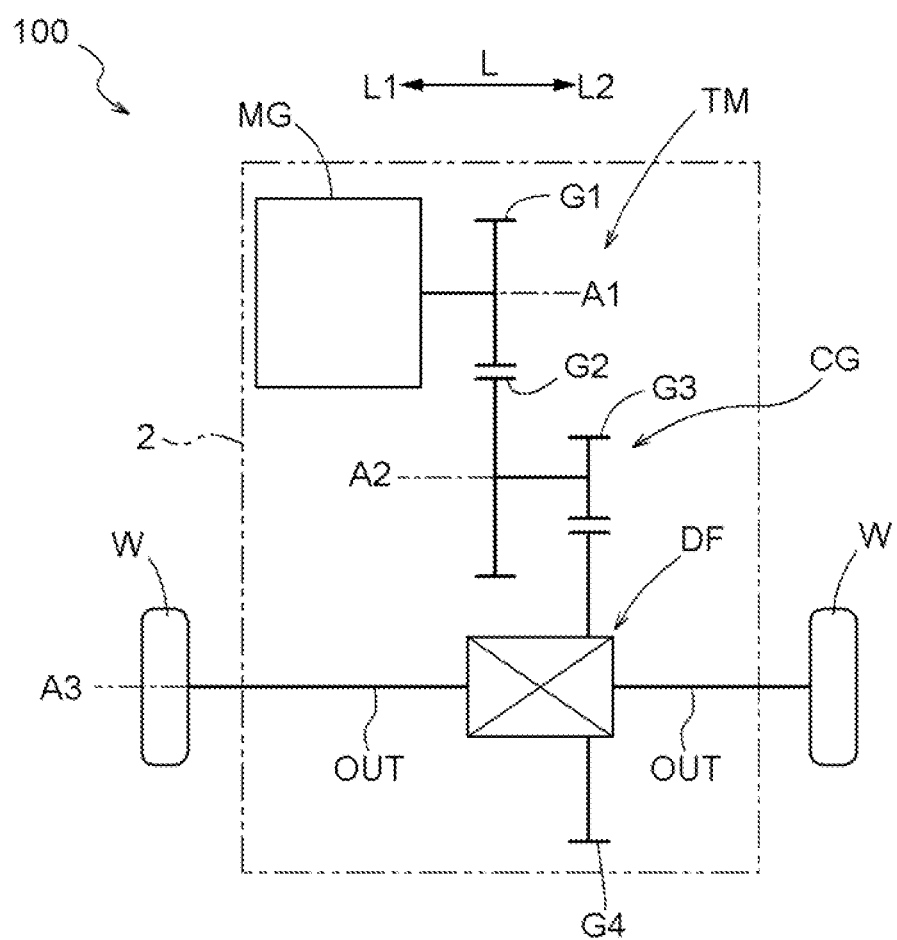
FIG. 7 is a skeleton diagram of the vehicle drive apparatus.

As illustrated in FIGS. 7 and 9, the counter driven gear G2 is larger in diameter than the other gears of the transmission mechanism TM. Thus, disposing the third axis A3 (on which the counter gear mechanism CG including the large-diameter gear is to be disposed) below the first axis A1 and the second axis A2 leaves a space above the first axis A1 and the second axis A2 more easily than when the third axis A3 is disposed above the first axis A1 and the second axis A2. Using the space left in this manner, the inverter device INV is disposed at a location above the counter driven gear G2 of the counter gear mechanism CG and overlapping with the counter driven gear G2 in the vertical view. This makes it possible to prevent the vehicle drive apparatus 100 from increasing in size in the vertical direction V, making the vehicle drive apparatus 100 smaller in size. The use of the space left enables efficient wiring of the alternating-current power lines 50.

As described above with reference to FIG. 9, the inverter device INV is disposed to overlap with the output members OUT in the vertical view along the vertical direction V. In the present embodiment, the inverter device INV is disposed to overlap also with the transmission mechanism TM. The inverter device INV is thus disposed to overlap with both of the transmission mechanism TM and the output members OUT. Specifically, the location of the inverter device INV in the single-piece case 1 overlaps with not only the output members OUT but also the transmission mechanism TM in the vertical view. Accordingly, the present embodiment further facilitates preventing the inverter housing chamber 3, which houses the inverter device INV, from expanding in the vertical direction V.

As illustrated in FIG. 11, the present embodiment involves disposing the inverter device INV such that the inverter device INV overlaps also with the rotary electric machine MG in the vertical view. When the inverter device INV is disposed to overlap with the output members OUT in the vertical view, the inverter device INV is disposed to overlap with both of the rotary electric machine MG and the output members OUT. When the inverter device INV is disposed to overlap with both of the transmission mechanism TM and the output members OUT in the vertical view as in the present embodiment, the inverter device INV is disposed to overlap with the output members OUT, the transmission mechanism TM, and the rotary electric machine MG.

Because the location of the inverter device INV in the single-piece case 1 overlaps also with the rotary electric machine MG in the vertical view, the present embodiment further facilitates preventing the inverter housing chamber 3, which houses the inverter device INV, from increasing in size in the vertical direction V.

As illustrated in FIG. 11, the inverter device INV is disposed in an extended region (front-rear extended region EH) of the device housing chamber 5 (first housing chamber) in the front-rear direction H. As used herein, the term "extended region (front-rear extended region EH) in the front-rear direction H" refers to a region between the outermost end of the device housing chamber 5 on the first front-rear side H1 and the outermost end of the device housing chamber 5 on the second front-rear side H2 in the vertical view. The inverter housing chamber 3 is thus defined between the outermost end of the device housing chamber 5 on the first front-rear side H1 and the outermost end of the device housing chamber 5 on the second front-rear side H2 in the vertical view. Accordingly, the inverter device INV housed in the inverter housing chamber 3 is disposed between the outermost end of the device housing chamber 5 on the first front-rear side H1 and the outermost end of the device housing chamber 5 on the second front-rear side H2 in the vertical view.

The location of the inverter device INV in the vertical view may be maximized within the range of the front-rear extended region EH, which is an extended region of the device housing chamber 5 in the front-rear direction H. Providing a sufficient location for the inverter device INV in the front-rear direction H enables the inverter device INV to be suitably housed in the inverter housing chamber 3 without expanding the location in the vertical direction V. Because the location of the inverter device INV is within the range of the front-rear extended region EH, the present embodiment prevents the vehicle drive apparatus 100 from expanding in the front-rear direction H, enabling a size reduction of the vehicle drive apparatus 100.

As illustrated in FIGS. 9 and 11, the inverter device INV is disposed within an extended region (vertical extended region EV) of the device housing chamber 5 (first housing chamber) in the vertical direction V. As used herein, the term "extended region (vertical extended region EV) in the vertical direction V" refers to a region between the outermost end of the device housing chamber 5 on the first vertical side V1 and the outermost end of the device housing chamber 5 on the second vertical side V2 in an axial view. The inverter housing chamber 3 is thus defined between the outermost end of the device housing chamber 5 on the first vertical side V1 and the outermost end of the device housing chamber 5 on the second vertical side V2 in the axial view. Accordingly, the inverter device INV housed in the inverter housing chamber 3 is disposed between the outermost end of the device housing chamber 5 on the first vertical side V1 and the outermost end of the device housing chamber 5 on the second vertical side V2 in the axial view.

As illustrated in FIGS. 4 and 9, the extended region of the device housing chamber 5 in the vertical direction V may vary depending on its positions in directions (such as the front-rear direction H and the axial direction L) perpendicular to the vertical direction V. The device housing chamber 5 is not limited to a cubic shape, such as a columnar cubic shape, extending in the vertical direction V such that the area of the extended portion is substantially equal to the area of the bottom surface of the device housing chamber 5. The device housing chamber 5 may have a partially cut shape. In such a case, disposing the inverter device INV in the cut region as described above with reference to the conceptual diagram of FIG. 4, for example, improves space use efficiency. This results in the vehicle drive apparatus 100 that would be unlikely to have any useless space if the vehicle drive apparatus 100 is installed on, for example, a vehicle.

As described above with reference to FIG. 9, the case 1 includes the support wall 8 integral with the case 1 and extending in the direction perpendicular to the first axis A1. As illustrated in FIGS. 9 and 11, the inverter housing chamber 3 (second housing chamber) is provided on both sides of the support wall 8 in the axial direction L as viewed in the vertical direction. Accordingly, the inverter device INV is provided and disposed on both sides of the support wall 8 in the axial direction L as viewed in the vertical direction.

As previously mentioned, providing the device housing chamber 5 with the support wall 8 enables the rotary electric machine MG and the transmission mechanism TM to be suitably housed in the device housing chamber 5 while preventing the case 1 from increasing in size. The present embodiment is also able to enhance the rigidity of the case 1 with the support wall 8. Because the inverter housing chamber 3 is also provided on both sides of the support wall 8 in the axial direction L as viewed in the vertical direction, the present embodiment facilitates providing the location of the inverter device INV in the axial direction L.

As previously described, the device housing chamber 5 includes the rotary electric machine housing portion 2 and the differential gear housing portion 4. The device housing chamber 5 further includes a counter gear mechanism housing portion housing the counter gear mechanism CG, although no reference sign is given thereto. The differential gear housing portion 4 and the counter gear mechanism housing portion correspond to a gear housing portion (third housing portion). Accordingly, the device housing chamber 5 (first housing chamber) includes: the rotary electric machine housing portion 2 housing the rotary electric machine MG; and the gear housing portion (third housing portion). The support wall 8 divides a space (rotary electric machine housing portion) of the device housing chamber 5, which houses the rotary electric machine MG, from the gear housing portion (third housing portion). The support wall 8 is able to suitably divide the device housing chamber 5 and suitably support the rotary electric machine MG housed in the rotary electric machine housing portion 2, and the counter gear mechanism CG and the differential gear mechanism DF housed in the gear housing portion (third housing portion).

Figure 12:
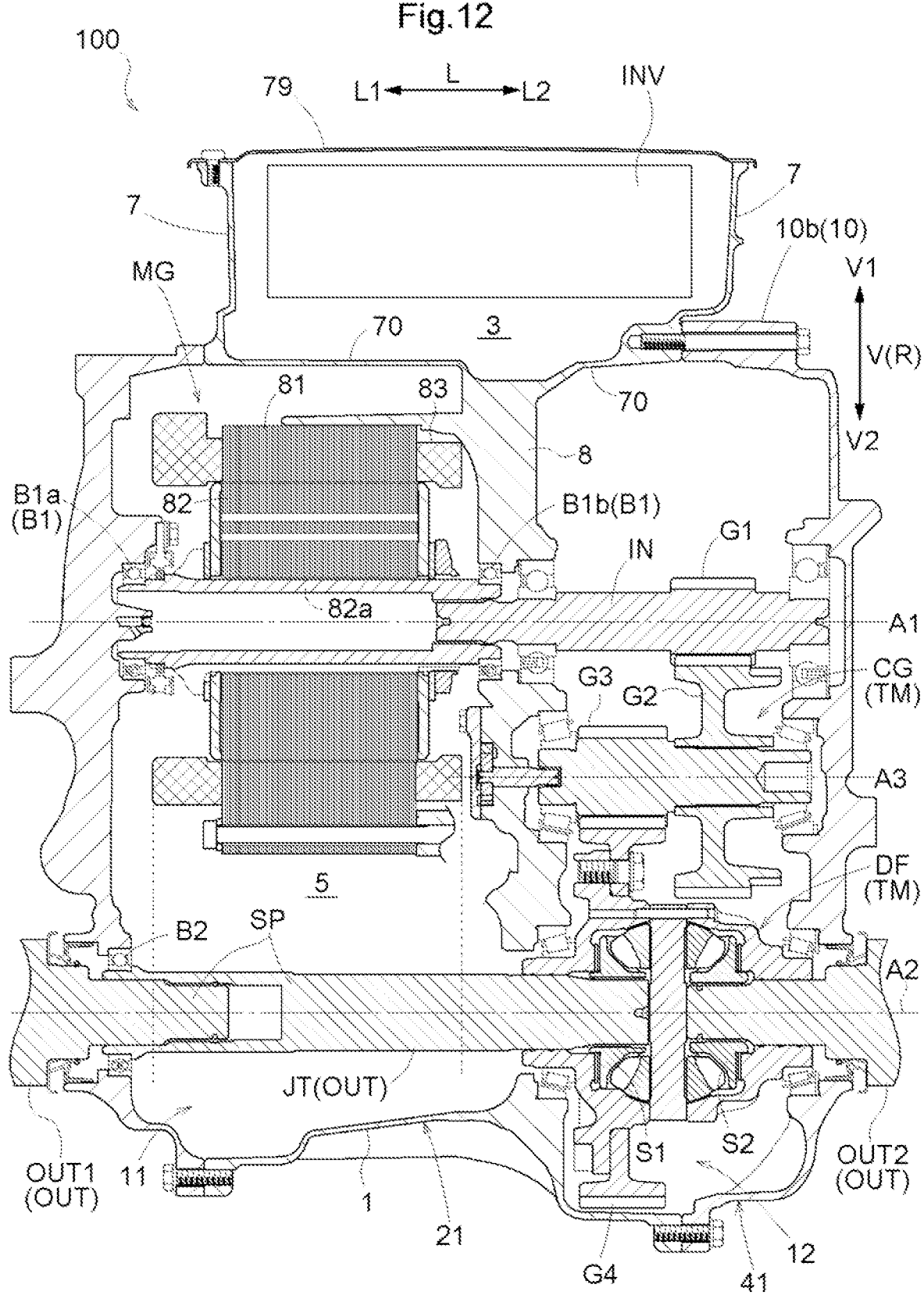
FIG. 12 is a cross-sectional view of a vehicle drive apparatus having an alternative structure in an axial direction.
Figure 13:
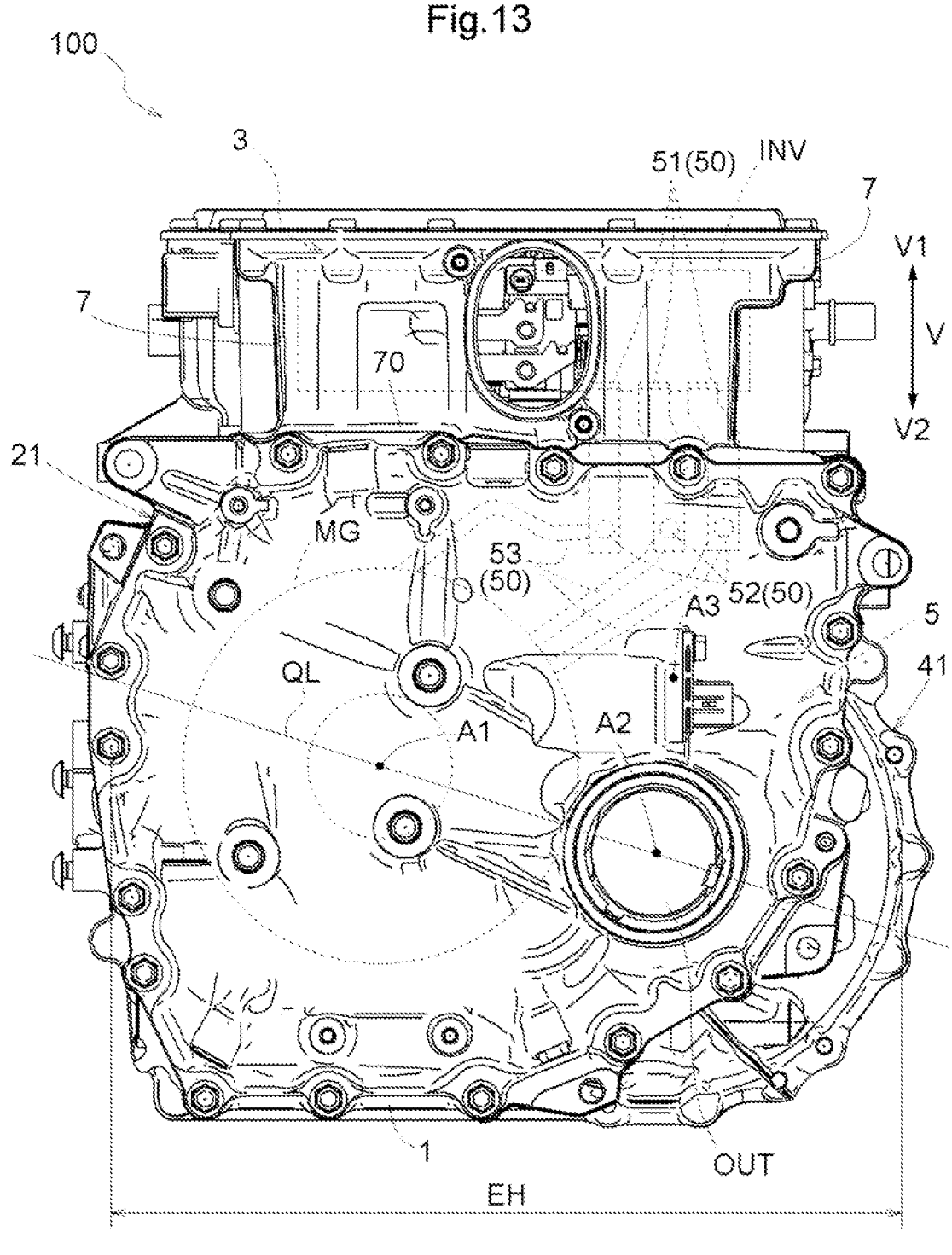
FIG. 13 is a cross-sectional view of the vehicle drive apparatus having the alternative structure in a direction perpendicular to the axial direction.
Figure 14:
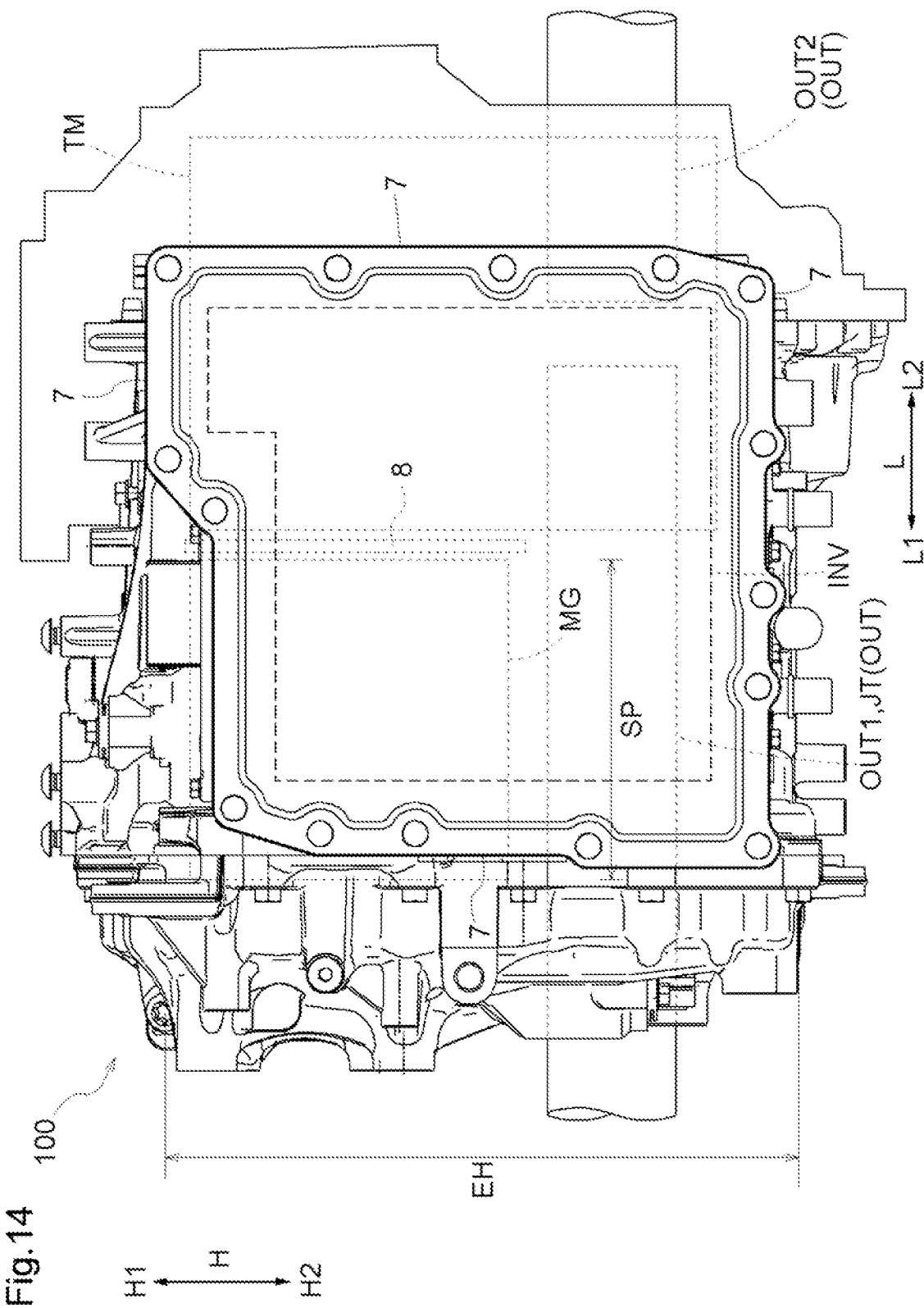
FIG. 14 is a plan view of the vehicle drive apparatus having the alternative structure as viewed from a first vertical side.
Figure 15:
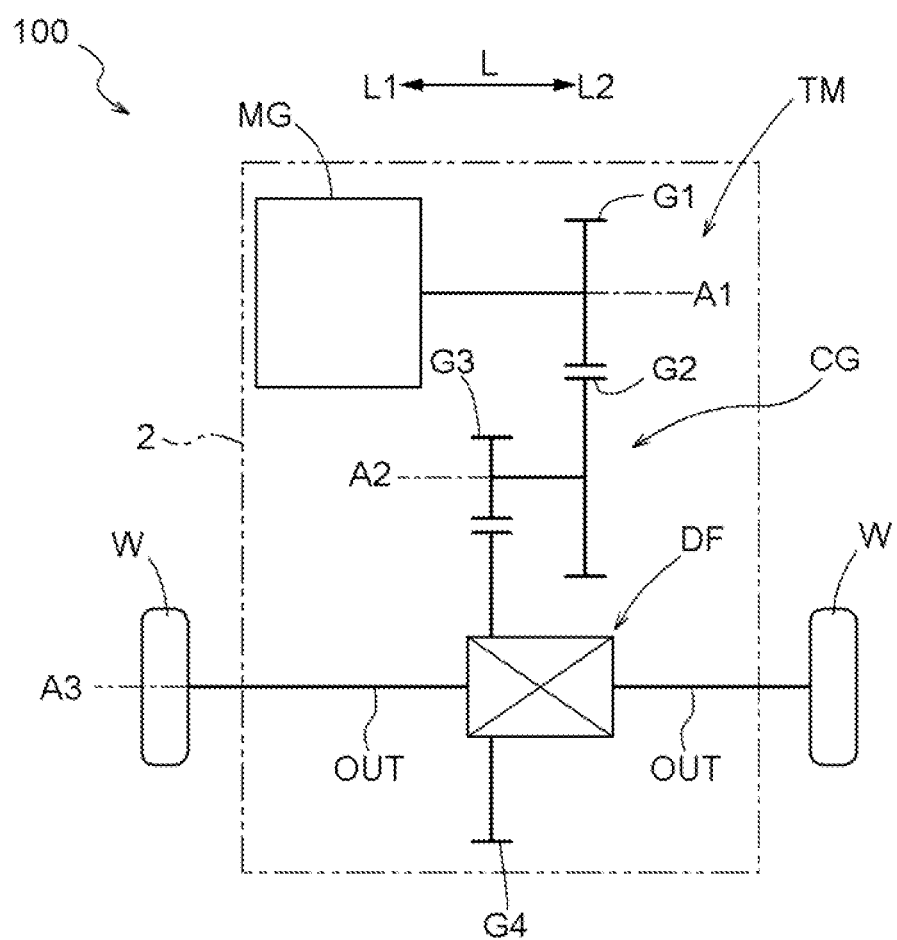
FIG. 15 is a skeleton diagram of the vehicle drive apparatus having the alternative structure.

For the mode associated with FIGS. 1 to 4, FIG. 6, and FIG. 7, the above description has illustrated the structure of the vehicle drive apparatus 100 in more detail with reference to FIGS. 9 to 11. A vehicle drive apparatus 100 having a different structure will now be described with reference to FIGS. 12 to 15. When deemed appropriate, the mode illustrated in FIGS. 1 to 11 will hereinafter be referred to as a "first embodiment", and the mode illustrated in FIGS. 12 to 15 will hereinafter be referred to as a "second embodiment". Also in the following description, components similar to those in the above description will be identified by the same reference signs. FIG. 12 is an axial cross-sectional view of the vehicle drive apparatus 100 having a structure different from that described above. FIG. 13 is a cross-sectional view of the vehicle drive apparatus 100 in a direction perpendicular to an axial direction. FIG. 14 is a plan view of the vehicle drive apparatus 100 as viewed from a first vertical side V1. FIG. 15 is a skeleton diagram of the vehicle drive apparatus 100.

Similarly to the first embodiment described above with reference to, for example, FIGS. 1 and 9, the vehicle drive apparatus 100 includes: a rotary electric machine MG disposed on a first axis A1; output members OUT disposed on a second axis A2; a transmission mechanism TM; an inverter device INV; and a case 1. The case 1 is a single-piece case internally including: a device housing chamber 5 (first housing chamber) housing the rotary electric machine MG and at least a portion of each output member OUT; and an inverter housing chamber 3 (second housing chamber) housing the inverter device INV and divided from the device housing chamber 5 with a partition 70. The first axis A1 and the second axis A2 are different axes parallel to each other. As illustrated in FIG. 12, the inverter device INV is disposed to overlap with the output members OUT in a vertical view along a vertical direction V.

Also in the second embodiment, as viewed in an axial direction L, at least a portion of the inverter device INV is disposed on the same side as the output members OUT relative to the first axis A1 or disposed on a second front-rear side H2 (see FIG. 13).

At least a specified portion SP (see FIG. 12) of the output member OUT, which is a portion whose location in the axial direction L overlaps with the rotary electric machine MG, is housed in the device housing chamber 5. The partition 70 is provided between the specified portion SP and the inverter device INV.

Unlike when the two housing chambers are separate components, the second embodiment also enables sharing of the partition 70 dividing the device housing chamber 5 from the inverter housing chamber 3, leading to a reduction in the weight of the case 1 similarly to the first embodiment. The device housing chamber 5 houses both of: the rotary electric machine MG serving as a driving force source for wheels W; and the output members OUT drivingly connected to the wheels W. This allows the first axis A1 and the second axis A2 to be easily disposed close to each other. Accordingly, the second embodiment is also able to reduce the size of the vehicle drive apparatus 100. The location of the inverter device INV in the single-piece case 1 overlaps with the output members OUT in the vertical view. The second embodiment thus facilitates preventing expansion of the inverter housing chamber 3 in the vertical direction V aimed at increasing the volumetric capacity of the inverter housing chamber 3 housing the inverter device INV.

As described above, at least a portion of the inverter device INV is disposed on the same side as the output members OUT relative to the first axis A1. The partition 70 is provided between the specified portion SP and the inverter device INV. Accordingly, the location of the inverter device INV in the single-piece case 1 is easily overlapped with the output members OUT in the radial direction R. This also facilitates preventing expansion of the inverter housing chamber 3 in the vertical direction V aimed at increasing the volumetric capacity of the inverter housing chamber 3 housing the inverter device INV.

As illustrated in FIGS. 12 to 14, the partition 70 dividing the device housing chamber 5 from the inverter housing chamber 3 is disposed to overlap with the specified portion SP and the inverter device INV as viewed in the radial direction R of the output members OUT (which substantially corresponds to the vertical direction V). Because the partition 70 is disposed to overlap with the specified portion SP and the inverter device INV, the location of the inverter device INV in the single-piece case 1 is easily overlapped with the output members OUT in the radial direction R, and the inverter housing chamber 3 housing the inverter device INV is easily prevented from expanding in the vertical direction V.

As illustrated in FIG. 12, the partition 70 dividing the device housing chamber 5 from the inverter housing chamber 3 is disposed between the inverter device INV and the output members OUT. Also in the second embodiment, disposing the partition 70, which divides the device housing chamber 5 from the inverter housing chamber 3, between the inverter device INV and the output members OUT makes it possible to prevent the single-piece case 1, internally including the device housing chamber 5 and the inverter housing chamber 3, from increasing in dimension in the vertical direction V similarly to the first embodiment.

Also in the second embodiment, the partition 70 dividing the device housing chamber 5 from the inverter housing chamber 3 is disposed not only between the inverter device INV and the output members OUT but also between the inverter device INV and the rotary electric machine MG as illustrated in FIG. 12. The second embodiment is thus able to increase the volumetric capacity of the inverter housing chamber 3, prevent the case 1 from increasing in dimension in the vertical direction V, and make the vehicle drive apparatus 100 smaller in size. Also in the second embodiment, the device housing chamber 5 and the inverter housing chamber 3 are divided from each other with the single shared partition 70 similarly to the first embodiment.

The case 1 includes: a first peripheral wall 21 formed to surround the rotary electric machine MG and connected to the partition 70; and a second peripheral wall 41 formed to surround the output members OUT and connected to the partition 70. Providing the partition 70 serving as portions of the first peripheral wall 21 and the second peripheral wall 41 in this manner prevents the case 1 from increasing in size and thus prevents the vehicle drive apparatus 100 from increasing in scale. Lower portions of the partition 70 in the vertical direction V are connected to the first peripheral wall 21 and the second peripheral wall 41. The second peripheral wall 41 and the partition 70 are connected to the partition 70 on the opposite side of the first axis A1 in a front-rear direction H relative to the second axis A2.

The case 1 includes a rib 7 (side wall) extending from the partition 70 and formed to surround the inverter device INV. Providing this rib 7 (side wall) makes it possible to suitably provide the inverter housing chamber 3 housing the inverter device INV.

Also in the second embodiment, alternating-current power lines 50 connecting the rotary electric machine MG to the inverter device INV are disposed between the partition 70 and the output members OUT as illustrated in FIG. 13. Also in the second embodiment, the rotary electric machine MG and the output members OUT are housed in the device housing chamber 5 defined in the single-piece case 1, so that an empty space is easily provided in the device housing chamber 5. Disposing the alternating-current power lines 50 in such an empty space prevents the vehicle drive apparatus 100 from increasing in size while leaving a wiring space. The inverter device INV overlaps with the output members OUT in the vertical view. Accordingly, disposing the alternating-current power lines 50 between the partition 70 and the output members OUT enables the alternating-current power lines 50 to suitably make an electric connection between the rotary electric machine MG and the inverter device INV at a short distance.

Also in the second embodiment, the transmission mechanism TM includes a differential gear mechanism DF to distribute a driving force, which is transmitted thereto from the rotary electric machine MG, to the pair of wheels W similarly to the first embodiment. The output members OUT each transmit the driving force, which is distributed thereto from the differential gear mechanism DF, to an associated one of the pair of wheels W. The output member OUT disposed on a first axial side L1 will be referred to as a "first output member OUT1". The output member OUT disposed on a second axial side L2 will be referred to as a "second output member OUT2". The first output member OUT1 is connected to the differential gear mechanism DF through a connecting shaft JT. The connecting shaft JT is also included in the output members OUT. The output members OUT thus include the first output member OUT1, the second output member OUT2, and the connecting shaft JT. As illustrated in FIG. 12, the output members OUT extend out of the case 1. At least a portion of the output member OUT (or portions of the first output member OUT1 and the connecting shaft JT), whose location in the axial direction L overlaps with the rotary electric machine MG, is housed in the device housing chamber 5. In the mode illustrated in FIG. 12, a portion of the second output member OUT2 is also housed in the device housing chamber 5.

Also in the second embodiment, the vehicle drive apparatus 100 includes, as illustrated in FIG. 12, a body cover 10 (first cover) covering the device housing chamber 5, and a cover member 79 (second cover) covering the inverter housing chamber 3. A drive apparatus case is defined by: the case 1 serving as a body case; a first body cover 10*a* covering a first opening 11 of the case 1 located on the first axial side L1; a second body cover 10*b* covering a second opening 12 of the case 1 located on the second axial side L2; and the cover member 79. The body cover 10 includes the first body cover 10*a* and the second body cover 10*b*. The first body cover 10*a* and the second body cover 10*b* correspond to the first cover. Similarly to the first embodiment, the second embodiment is also able to facilitate electrically connecting the inverter device INV to the rotary electric machine MG through the alternating-current power lines 50 from outside the case 1, resulting in improved productivity.

The device housing chamber 5 houses: first bearings B1 supporting the rotary electric machine MG such that the rotary electric machine MG is rotatable; and a second bearing B2 supporting the output member OUT (or the first output member OUT1) such that the output member OUT is rotatable. The second bearing B2 is supported by the first body cover 10a. The first output member OUT1 is supported by the second bearing B2 on the first axial side L1 and connected to the connecting shaft JT on the second axial side L2. The connecting shaft JT is connected to a first side gear S1 of the differential gear mechanism DF on the second axial side L2. The second output member OUT2 is connected to a second side gear S2 of the differential gear mechanism DF on the first axial side. Also in the second embodiment, the first bearings B 1 and the second bearing B2 are housed in the same device housing chamber 5 and may thus be lubricated with the same oil. Naturally, the first side gear S1 and the second side gear S2 are included in the differential gear mechanism DF but not included in the output members OUT.

The rotary electric machine MG includes a rotor shaft 82a supported by the first bearings B1 on both of the first axial side L1 and the second axial side L2 such that the rotor shaft 82a is rotatable. The first bearing B1 on the first axial side L1 will hereinafter be referred to as a "first rotor bearing B1a". The first bearing B1 on the second axial side L2 will hereinafter be referred to as a "second rotor bearing Bib". Similarly to the second bearing B2, the first rotor bearing B1a is supported by the first body cover 10a. The second rotor bearing B1b is supported by a support wall 8 (which will be described below). As illustrated in FIG. 12, the support wall 8 is integral with the case 1 and extends in a direction perpendicular to the axial direction L.

Because the first bearing B1 (or the first rotor bearing B1a) and the second bearing B2 are attached to the first body cover 10a (first cover), the second embodiment is able to support the rotary electric machine MG and the output member OUT at locations adjacent to an end of the case 1 on the first axial side L1 in the axial direction L, and to prevent the vehicle drive apparatus 100 from increasing in scale. A sealing member to seal a through hole for the output member OUT is attached to the body cover 10 (first cover).

The rotor shaft 82a of the rotary electric machine MG is connected to an input member IN and rotates together with the input member IN. The input member IN is provided with an input gear G1. The input member IN is rotatably supported by the support wall 8 through a bearing on the first axial side L1 and rotatably supported by the second body cover 10b through a bearing on the second axial side. No reference signs are given to these bearings in FIG. 12. Similarly, a counter gear mechanism CG is also rotatably supported by the support wall 8 through a bearing on the first axial side L1 and rotatably supported by the second body cover 10b through a bearing on the second axial side. The differential gear mechanism DF is also rotatably supported by the support wall 8 through a bearing on the first axial side L1 and rotatably supported by the second body cover 10b through a bearing on the second axial side. Also in the second embodiment, providing the device housing chamber 5 with the support wall 8 enables the rotary electric machine MG and the transmission mechanism TM to be suitably housed in the device housing chamber 5, while preventing the case 1 from increasing in size.

Also in the second embodiment, the transmission mechanism TM includes, as also illustrated in FIG. 12, the counter gear mechanism CG disposed on a third axis A3 different from and parallel to the first axis A1 and the second axis A2 similarly to the first embodiment. The counter gear mechanism CG includes: a counter driven gear G2 (first gear) in mesh with a gear on the first axis A1 (which is the input gear G1); and a counter drive gear G3 (second gear) in mesh with a gear on the second axis A2 (which is a differential input gear G4). Unlike the first embodiment, the counter drive gear G3 (second gear) in the second embodiment is disposed closer to the rotary electric machine MG than the counter driven gear G2 (first gear) in the axial direction L as illustrated in FIGS. 13 and 15. As illustrated in FIG. 13, the third axis A3 is disposed above a virtual line QL in the vertical direction V. The virtual line QL connects the first axis A1 with the second axis A2. As illustrated in FIG. 12, the inverter device INV is located on the first vertical side V1 relative to (or located above) the counter driven gear G2 (first gear) in the vertical direction V, and is disposed to overlap with the counter drive gear G3 in the vertical view.

As illustrated in FIGS. 12 and 15, the counter driven gear G2 is larger in diameter than the other gears of the transmission mechanism TM. When the counter gear mechanism CG functions as a speed reducer, the counter driven gear G2 (first gear) usually tends to be larger in gear diameter than the counter drive gear G3 (second gear). The first embodiment has the same tendency. When the inverter device INV is disposed to overlap with the rotary electric machine MG and the counter drive gear G3, which is relatively small in gear diameter, in the vertical view while avoiding the counter driven gear G2 relatively large in gear diameter as in the second embodiment, the inverter device INV would be disposed at a relatively low location if the third axis A3 for the counter gear mechanism CG is disposed on the first vertical side V1 relative to (or disposed above) the first axis A1 and the second axis A2. Consequently, the second embodiment is able to prevent the vehicle drive apparatus 100 from increasing in dimension in the vertical direction V.

As described above with reference to FIG. 12, the second embodiment also involves disposing the inverter device INV such that the inverter device INV overlaps with the output members OUT in the vertical view along the vertical direction V. In the present embodiment, the inverter device INV is disposed to overlap also with the transmission mechanism TM. The inverter device INV is thus disposed to overlap with both of the transmission mechanism TM and the output members OUT. The second embodiment is also not only able to allow the location of the inverter device INV in the single-piece case 1 to overlap with the output members OUT in the vertical view, but also able to expand the location of the inverter device INV to such an extent that the location of the inverter device INV overlaps with the transmission mechanism TM. Consequently, the second embodiment further facilitates preventing the inverter housing chamber 3, which houses the inverter device INV, from expanding in the vertical direction V.

As illustrated in FIGS. 12 to 14, the inverter device INV in the second embodiment is disposed to overlap also with the rotary electric machine MG in the vertical view. When the inverter device INV is disposed to overlap with the output members OUT in the vertical view, the inverter device INV is disposed to overlap with both of the rotary electric machine MG and the output members OUT. When the inverter device INV is disposed to overlap with both of the transmission mechanism TM and the output members OUT in the vertical view as in the present embodiment, the inverter device INV is disposed to overlap with the output members OUT, the transmission mechanism TM, and the rotary electric machine MG. Because the location of the inverter device INV in the single-piece case 1 is overlapped also with the rotary electric machine MG in the vertical view, the second embodiment further facilitates preventing the inverter housing chamber 3, which houses the inverter device INV, from expanding in the vertical direction V.

As illustrated in FIG. 11, the inverter device INV is disposed in an extended region (front-rear extended region EH) of the device housing chamber 5 (first housing chamber) in the front-rear direction H. As used herein, the term "extended region (front-rear extended region EH) in the front-rear direction H" refers to a region between the outermost end of the device housing chamber 5 on a first front-rear side H1 and the outermost end of the device housing chamber 5 on the second front-rear side 112 in the vertical view. The inverter housing chamber 3 is thus defined between the outermost end of the device housing chamber 5 on the first front-rear side H1 and the outermost end of the device housing chamber 5 on the second front-rear side H2 in the vertical view. Accordingly, the inverter device INV housed in the inverter housing chamber 3 is disposed between the outermost end of the device housing chamber 5 on the first front-rear side H1 and the outermost end of the device housing chamber 5 on the second front-rear side H2 in the vertical view.

Also in the second embodiment, the location of the inverter device INV in the vertical view may be maximized within the range of the front-rear extended region EH, which is an extended region of the device housing chamber 5 in the front-rear direction H, similarly to the second embodiment. Providing a sufficient location for the inverter device INV in the front-rear direction H enables the inverter device INV to be suitably housed in the inverter housing chamber 3 without expanding the location in the vertical direction V. Because the location of the inverter device INV is within the range of the front-rear extended region EH, the second embodiment also prevents the vehicle drive apparatus 100 from expanding in the front-rear direction H, enabling a size reduction of the vehicle drive apparatus 100.

Also in the second embodiment, the case 1 includes the support wall 8 integral with the case 1 and extending in the direction perpendicular to the first axis A1 similarly to the first embodiment. As illustrated in FIGS. 12 and 14, the inverter housing chamber 3 (second housing chamber) is provided on both sides of the support wall 8 in the axial direction L as viewed in the vertical direction. Accordingly, the inverter device INV is provided and disposed on both sides of the support wall 8 in the axial direction L as viewed in the vertical direction.

As previously mentioned, providing the device housing chamber 5 with the support wall 8 enables the rotary electric machine MG and the transmission mechanism TM to be suitably housed in the device housing chamber 5 while preventing the case 1 from increasing in size. The second embodiment is also able to enhance the rigidity of the case 1 with the support wall 8. The inverter housing chamber 3 is also provided on both sides of the support wall 8 in the axial direction L as viewed in the vertical direction. This facilitates providing the location of the inverter device INV in the axial direction L.

As previously described, the device housing chamber 5 includes a rotary electric machine housing portion 2 and a differential gear housing portion 4. The device housing chamber 5 further includes a counter gear mechanism housing portion housing the counter gear mechanism CG, although no reference sign is given thereto. The differential gear housing portion 4 and the counter gear mechanism housing portion correspond to the gear housing portion (third housing portion). Accordingly, the device housing chamber 5 (first housing chamber) includes: the rotary electric machine housing portion 2 housing the rotary electric machine MG; and the gear housing portion (third housing portion). The support wall 8 divides a space (rotary electric machine housing portion) of the device housing chamber 5, which houses the rotary electric machine MG, from the gear housing portion (third housing portion). The support wall 8 is able to suitably divide the device housing chamber 5 and suitably support the rotary electric machine MG housed in the rotary electric machine housing portion 2, and the counter gear mechanism CG and the differential gear mechanism DF housed in the gear housing portion (third housing portion).

Alternative Embodiments

Alternative embodiments will be described below. A structure of each embodiment described below does not necessarily have to be used solely but may be used in combination with structure(s) of other embodiment(s) as long as no contradiction arises.

(1) The above description has illustrated, by way of example, the vehicle drive apparatus 100 including the rotary electric machine MG serving as a driving force source for the wheels W. Alternatively, the vehicle drive apparatus 100 may be a hybrid drive apparatus including both of an internal combustion engine and the rotary electric machine MG, each serving as a driving force source for the wheels W of a vehicle. Examples of the hybrid drive apparatus include hybrid drive apparatuses of various types, such as a "one-motor parallel type" and a "two-motor split type".

(2) The above description has illustrated, by way of example, the three-axis vehicle drive apparatus 100 including three axes (i.e., the axes A1, A2, and A3) disposed in parallel with each other. Alternatively, the vehicle drive apparatus 100 may be a two-axis vehicle drive apparatus including two axes (e.g., the axes A1 and A3) disposed in parallel with each other. The vehicle drive apparatus 100 may further include one or more axes different from and disposed in parallel with the axes A1, A2, and A3 such that four or more axes are disposed in parallel with each other.

(3) The above description has illustrated, by way of example, the mode in which the rib 7 includes the first rib 71, the second rib 72, the connecting rib 73, and the auxiliary connecting rib 74 with reference to, for example, FIG. 1, and the mode in which the rib 7 includes the first rib 71, the second rib 72, and the auxiliary connecting rib 74 with reference to, for example, FIG. 8. Alternatively, the rib 7 may include no auxiliary connecting rib 74. When the cover member 79 is provided with a portion of the housing wall 30 corresponding to the first rib 71 or the second rib 72 similarly to the mode described above with reference to, for example, FIG. 8, the rib 7 may include either one of the first rib 71 and the second rib 72. In this case, the rib 7 may be provided opposite to the first opening 11 in the axial direction L, although the above description has illustrated the mode in which the rib 7 (or the first rib 71) is provided adjacent to the first opening 11 in the axial direction L.

Figure 5:
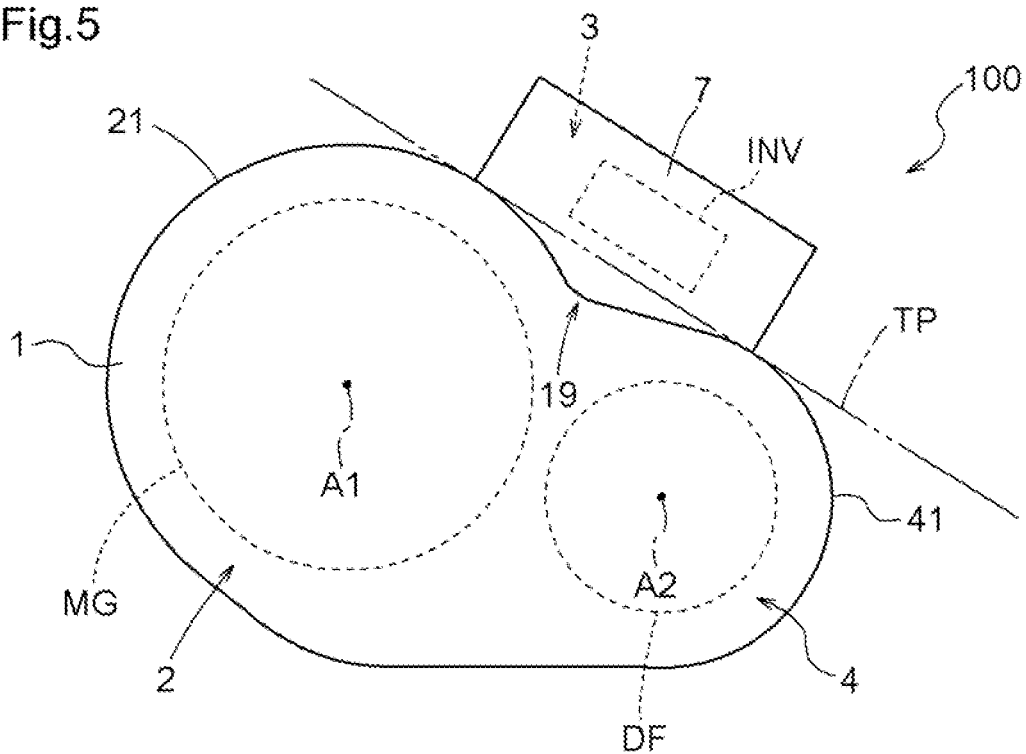
FIG. 5 is a conceptual diagram illustrating another relationship between the rotary electric machine housing portion and the inverter housing chamber as viewed in the axial direction.

(4) As illustrated in FIGS. 1, 4, and 8, the above description has illustrated, by way of example, the mode in which the inverter device INV is disposed along a plane (i.e., a horizontal plane in each of the diagrams) intersecting the tangential plane TP tangent to both of the outer surface of the first peripheral wall 21 and the outer surface of the second peripheral wall 41. The present invention, however, is not limited to this mode. The position of the inverter device INV disposed in the inverter housing chamber 3 may be set to an appropriate position. As illustrated in FIG. 5, for example, the inverter device INV may be disposed obliquely relative to the horizontal plane such that the inverter device INV extends along the tangential plane TP tangent to both of the outer surface of the first peripheral wall 21 and the outer surface of the second peripheral wall 41.

(5) As illustrated in FIGS. 1 and 8, the above description has illustrated, by way of example, the mode in which the rib 7 has a wall shape extending along the virtual plane QP perpendicular to the axial direction L. Alternatively, the rib 7 may have any other shape. The rib 7 may be any rib that extends on both sides of the recess 19 in a direction along the virtual plane QP perpendicular to the axial direction L so as to connect the first peripheral wall 21 with the second peripheral wall 41. The rib 7 itself does not need to have a shape extending along the virtual plane QP. Accordingly, the rib 7 may have a wall shape extending along a direction perpendicular to the virtual plane QP. Also in such a case, the rib 7 is able to reinforce the recess 19 defined in the connection between the first peripheral wall 21 and the second peripheral wall 41.

Summary of Embodiments

A brief summary of the vehicle drive apparatus (100) described above will be given below.

The vehicle drive apparatus (100) according to one aspect includes: a rotary electric machine (MG) disposed on a first axis (A1); a transmission mechanism (TM) to which a driving force is to be transmitted from the rotary electric machine (MG); a differential gear mechanism (DF) disposed on a second axis (A2) different from and parallel to the first axis (A1), the differential gear mechanism (DF) being configured to distribute the driving force, which is transmitted thereto from the rotary electric machine (MG) through the transmission mechanism (TM), to a wheel; an output member (OUT) disposed on the second axis (A2) and drivingly connecting the differential gear mechanism (DF) to the wheel (W); an inverter device (INV) to control driving of the rotary electric machine (MG); and a single-piece case (1) internally including a first housing chamber (5) housing the rotary electric machine (MG), and a second housing chamber (3) housing the inverter device (INV). At least a specified portion (SP) of the output member (OUT) is housed in the first housing chamber (5). A location of the specified portion (SP) in an axial direction (L) overlaps with the rotary electric machine (MG). The axial direction (L) is along the first axis (A1). The single-piece case (1) includes a partition (70) dividing the first housing chamber (5) from the second housing chamber (3). The partition (70) is provided between the specified portion (SP) and the inverter device (INV).

In this structure, the single-piece case (1) internally includes the first housing chamber (5) and the second housing chamber (3) and is thus higher in rigidity than a case (1) including a first housing chamber (5) and a second housing chamber (3) that are separate components assembled to the case (1). Unlike when the two housing chambers are separate components, this structure enables sharing of the partition (70) dividing the first housing chamber (5) from the second housing chamber (3), leading to a reduction in the weight of the case (1). The first housing chamber (5) houses both of: the rotary electric machine (MG) serving as a driving force source; and the output member (OUT) drivingly connected to the wheel (W). This enables the first axis (A1) and the second axis (A2) to be disposed close to each other, resulting in a reduction in the size of the vehicle drive apparatus (100). In this structure, the partition (70) is provided between the specified portion (SP) and the inverter device (INV). Accordingly, this structure facilitates allowing the location of the inverter device (INV) in the single-piece case (1) to overlap with the output member (OUT) in a radial direction (R). This structure thus facilitates preventing expansion of the second housing chamber (3), which houses the inverter device (INV), in a vertical direction (V). Consequently, this structure is able to provide the vehicle drive apparatus (100) whose inverter device (INV) is also housed in the case (1), while preventing an entirety of the apparatus from increasing in size.

As viewed in the axial direction (L), the output member (OUT) and at least a portion of the inverter device (INV) are preferably disposed on one side relative to the first axis (A1) in a front-rear direction (H).

This structure facilitates allowing the location of the inverter device (INV) in the single-piece case (1) to overlap with the output member (OUT) in the radial direction (R).

The case (1) includes a support wall (8) integral with the case (1) and extending in a direction perpendicular to the first axis (A1). The support wall (8) supports at least the rotary electric machine (MG) such that the rotary electric machine (MG) is rotatable. The second housing chamber (3) is provided on both sides of the support wall (8) in the axial direction that is along the first axis (A1).

Providing the support wall (8) enables the rotary electric machine (MG) to be suitably housed in the first housing chamber (5) while preventing the case (1) from increasing in size. This also makes it possible to enhance the rigidity of the case (1) with the support wall (8). The second housing chamber (3) is also provided on both sides of the support wall (8) in the axial direction (L) as viewed in the vertical direction. This facilitates providing the location of the inverter device (INV) in the axial direction (L).

The first housing chamber (5) preferably includes a third housing chamber. The support wall (8) preferably divides a space (2) of the first housing chamber (5), which houses the rotary electric machine (MG), from the third housing chamber.

This structure not only enables the support wall (8) to divide the space (2) of the first housing chamber (5), which houses the rotary electric machine (MG), from a space of the first housing chamber (5), which houses other mechanisms included in the transmission mechanism (TM), but also enables the support wall (8) to suitably support the rotary electric machine (MG) and the transmission mechanism (TM), which includes the differential gear mechanism (DF).

The vehicle drive apparatus (100) preferably includes: a first peripheral wall (21) formed to surround the rotary electric machine (MG) and connected to the partition (70); and a second peripheral wall (41) formed to surround the output member (OUT) and connected to the partition (70).

Providing the partition (70) serving as portions of the first peripheral wall (21) and the second peripheral wall (41) in this manner prevents the case (1) from increasing in size and thus prevents the vehicle drive apparatus (100) from increasing in scale.

The first peripheral wall (21) preferably includes a portion (19) extending below a top portion (TOP) along a circumferential direction of the rotary electric machine (MG).

The partition (70) preferably includes an extension (19) extending toward an upper portion (TOP) of the first housing chamber (5) along a circumferential direction of the rotary electric machine (MG). The extension (19) is preferably connected to the first housing chamber (5).

The first peripheral wall (21) and the second peripheral wall (41) differ in diameter. For example, when the first peripheral wall (21) is larger in diameter than the second peripheral wall (41), the extension (19) connecting the first peripheral wall (21) with the second peripheral wall (41) is formed to extend toward the upper portion (TOP) of the first housing chamber (5) along the circumferential direction of the rotary electric machine (MG). Although a space adjacent to the extension (19) is likely to be a dead space, this space is usable as an installation space for the second housing chamber (3).

The case (1) preferably includes a side wall (7) extending from the partition (70) and the first peripheral wall (21) and formed to surround the inverter device (INV).

In this structure, the side wall (7) facilitates providing the second housing chamber (3) housing the inverter device (INV). The first peripheral wall (21) including the portion (19) extending below the top portion (TOP) along the circumferential direction of the rotary electric machine (MG) allows suitable placement of the second housing chamber (3) with the use of a space that may be a dead space, and enables an increase in the rigidity of the case (1).

The partition (70) is preferably disposed not only between the inverter device (INV) and the output member (OUT) but also between the inverter device (INV) and the rotary electric machine (MG).

Disposing the partition (70) not only between the inverter device (INV) and the output member (OUT) but also between the inverter device (INV) and the rotary electric machine (MG) enables an increase in the volumetric capacity of the second housing chamber (3). Consequently, this structure is able to prevent the case (1) from increasing in dimension in the vertical direction (V), making the vehicle drive apparatus (100) smaller in size.

The case (1) preferably includes a side wall (7) extending from the partition (70) and formed to surround the inverter device (INV).

Providing the side wall (7) described above makes it possible to suitably provide the second housing chamber (3) housing the inverter device (INV).

The inverter device (INV) is preferably disposed to overlap with both of the output member (OUT) and the transmission mechanism (TM) in a vertical view along a vertical direction.

This structure allows the location of the inverter device (INV) in the single-piece case (1) to overlap with not only the output member (OUT) but also the transmission mechanism (TM) in the vertical view. Accordingly, this structure further facilitates preventing the second housing chamber (3), which houses the inverter device (INV), from expanding in the vertical direction (V).

The inverter device (INV) is preferably disposed to overlap with both of the output member (OUT) and the rotary electric machine (MG) or disposed to overlap with the output member (OUT), the transmission mechanism (TM), and the rotary electric machine (MG).

This structure allows the location of the inverter device (INV) in the single-piece case (1) to overlap also with the rotary electric machine (MG) in the vertical view. Accordingly, this structure further facilitates preventing the second housing chamber (3), which houses the inverter device (INV), from expanding in the vertical direction (V).

The inverter device (INV) is preferably disposed in an extended region (EH) of the first housing chamber (5) in a front-rear direction (H) perpendicular to both of the axial direction (L), which is along the first axis (A1), and the vertical direction (V).

This structure is able to maximize the location of the inverter device (INV) in the vertical view within the range of the extended region (EH) of the first housing chamber (5) in the front-rear direction (H). Providing a sufficient location for the inverter device (INV) in the front-rear direction (H) enables the inverter device (INV) to be suitably housed in the second housing chamber (3) without expanding the location in the vertical direction (V). Because the location of the inverter device (INV) is within the range of the extended region (EH) of the first housing chamber (5) in the front-rear direction (H), this structure prevents the vehicle drive apparatus (100) from expanding in the front-rear direction (H), enabling a size reduction of the vehicle drive apparatus (100).

An alternating-current power line (50) connecting the rotary electric machine (MG) to the inverter device (INV) is preferably disposed between the partition (70) and the output member (OUT).

The rotary electric machine (MG) and the output member (OUT) are housed in the first housing chamber (5) defined in the single-piece case (1), so that an empty space is easily provided in the first housing chamber (5). Disposing the alternating-current power line (50) in such an empty space prevents the vehicle drive apparatus (100) from increasing in size while leaving a wiring space. The partition (70) divides the first housing chamber (5), which houses the rotary electric machine (MG), from the second housing chamber (3), which houses the inverter device (INV). In other words, the first housing chamber (5) and the second housing chamber (3) are adjacent to each other, with the shared partition (70) interposed therebetween. The inverter device (INV) overlaps with the output member (OUT) in the vertical view. Accordingly, disposing the alternating-current power line (50) between the partition (70) and the output member (OUT) enables the alternating-current power line (50) to suitably make a connection between the rotary electric machine (MG) and the inverter device (INV) at a short distance.

The inverter device (INV) is preferably disposed in an extended region (EV) of the first housing chamber (5) in the vertical direction (V).

The extended region (EV) of the first housing chamber (5) in the vertical direction (V) may vary depending on its positions in directions perpendicular to the vertical direction (V). The first housing chamber (5) is not limited to a cubic shape, such as a columnar cubic shape, extending along the vertical direction (V) such that the area of the extended portion is substantially equal to the area of the bottom surface of the first housing chamber (5). The first housing chamber (5) may have a partially cut shape. In such a case, disposing the inverter device (INV) in the cut region improves space use efficiency. This results in the vehicle drive apparatus (100) that would be unlikely to have any useless space if the vehicle drive apparatus (100) is installed on, for example, a vehicle.

Suppose that the transmission mechanism (TM) includes a counter gear mechanism (CG) disposed on a third axis (A3) different from and parallel to the first axis (A1) and the second axis (A2), and the counter gear mechanism (CG) includes: a first gear (G2) in mesh with a gear (G1) on the first axis (A1); and a second gear (G3) in mesh with a gear (G4) on the second axis (A2). In this case, the third axis (A3) is preferably disposed below (V2) a virtual line (QL), connecting the first axis (A1) with the second axis (A2), in the vertical direction (V), and the inverter device (INV) is preferably located above (V1) the first gear (G2) in the vertical direction (V) and disposed to overlap with the first gear (G2) in the vertical view. The first gear (G2) is preferably disposed closer to the rotary electric machine (MG) than the second gear (G3) in the axial direction (L) that is along the first axis (A1).

In this structure, the third axis (A3) on which the counter gear mechanism (CG) is to be disposed is located below the first axis (A1) and the second axis (A2), thus leaving a space above the first axis (A 1) and the second axis (A2) more easily than when the third axis (A3) is disposed above the first axis (A1) and the second axis (A2). Using the space left in this manner, this structure involves disposing the inverter device (INV) at a location above (or on the first vertical side (V1) relative to) the first gear (G2) of the counter gear mechanism (CG) and overlapping with the first gear (G2) in the vertical view. Accordingly, this structure is able to prevent the vehicle drive apparatus (100) from increasing in size in the vertical direction (V), making the vehicle drive apparatus (100) smaller in size.

Suppose that the transmission mechanism (TM) includes a counter gear mechanism (CG) disposed on a third axis (A3) different from and parallel to the first axis (A1) and the second axis (A2), and the counter gear mechanism (CG) includes: a first gear (G2) in mesh with a gear (G1) on the first axis (A1); and a second gear (G3) in mesh with a gear (G4) on the second axis (A2). In this case, another aspect is that the third axis (A3) is preferably disposed above (V1) a virtual line (QL), connecting the first axis (A1) with the second axis (A2), in the vertical direction (V), and the inverter device (NV) is preferably located above (V1) the second gear (G3) and the rotary electric machine (MG) in the vertical direction (V) and disposed to overlap with the second gear (G3) and the rotary electric machine (MG) in the vertical view. The second gear (G3) is preferably disposed closer to the rotary electric machine (MG) than the first gear (G2) in the axial direction (L) that is along the first axis (A1).

When the counter gear mechanism (CG) functions as a speed reducer, the first gear (G2) is usually larger in gear diameter than the second gear (G3). In this structure, the inverter device (INV) is disposed to overlap with the rotary electric machine (MG) and the second gear (G3), which is relatively small in gear diameter, in the vertical view, while avoiding the first gear (G2) relatively large in gear diameter. Accordingly, the inverter device (INV) would be disposed at a relatively low location if the third axis (A3) for the counter gear mechanism (CG) is disposed above (or disposed on the first vertical side (V1) relative to) the first axis (A1) and the second axis (A2). Consequently, this structure is able to prevent the vehicle drive apparatus (100) from increasing in dimension in the vertical direction (V).

The first housing chamber (5) preferably houses: a first bearing (B1) supporting the rotary electric machine (MG) such that the rotary electric machine (MG) is rotatable; and a second bearing (B2) supporting the output member (OUT) such that the output member (OUT) is rotatable.

In this structure, the first bearing (B1) and the second bearing (B2) are housed in the same first housing chamber (5) and may thus be lubricated with the same oil.

The vehicle drive apparatus (100) preferably includes: a first cover (10) covering the first housing chamber (5); and a second cover (79) covering the second housing chamber (3).

This structure is not only able to facilitate attaching the alternating-current power line (50), which is to be connected to the rotary electric machine (MG), from a location adjacent to the first cover (10), but also able to facilitate attaching the alternating-current power line (50), which is to be connected to the inverter device (INV), from a location adjacent to the second cover (79). Connection of the alternating-current power line (50) may involve providing an operation opening in the case (1). This structure, however, is able to make connection of the alternating-current power line (50) from both of a location adjacent to the first cover (10) and a location adjacent to the second cover (79), which eliminates the need to provide such an opening. Accordingly, this structure is able to reduce the manufacturing cost of the case (1) and prevent a reduction in the rigidity of the case (1) caused by such an opening.

When the vehicle drive apparatus (100) includes the first cover (10) covering the first housing chamber (5) and the second cover (79) covering the second housing chamber (3), the first bearing (B1) and the second bearing (B2) are preferably attached to the first cover (10).

This structure is able to support the rotary electric machine (MG) and the output member (OUT) at locations adjacent to an end of the case (1) on a first axial side (L1) in the axial direction (L), thus preventing the vehicle drive apparatus (100) from increasing in scale.

DESCRIPTION OF THE REFERENCE NUMERALS 1 case
3 inverter housing chamber (second housing chamber)
5 device housing chamber (first housing chamber)
7 rib (side wall)
8 support wall
10 body cover (first cover)
50 alternating-current power line
70 partition
79 cover member (second cover)
100 vehicle drive apparatus
A1 first axis
A2 second axis
A3 third axis
B1 first bearing
B2 second bearing
CG counter gear mechanism
DF differential gear mechanism
EH front-rear extended region (extended region of first housing chamber in front-rear direction)
EV vertical extended region (extended region of first housing chamber in vertical direction)
G1 input gear (gear on first axis)
G2 counter driven gear (first gear)
G3 counter drive gear (second gear)
G4 differential input gear (gear on second axis)
H front-rear direction
INV inverter device
L axial direction
MG rotary electric machine
OUT output member
QL virtual line
R radial direction
SP specified portion
TM transmission mechanism
TOP top portion (upper portion of first housing chamber)
V vertical direction
W wheel

The invention claimed is:
1. A vehicle drive apparatus, comprising:
a rotary electric machine;
a transmission mechanism to which a driving force is to be transmitted from the rotary electric machine;

a differential gear mechanism being configured to distribute the driving force, which is transmitted thereto from the rotary electric machine through the transmission mechanism, to a wheel;
an inverter device to control driving of the rotary electric machine; and
a single-piece case internally including a first chamber housing the rotary electric machine and a second chamber housing the inverter device; wherein
a direction that is along a rotation axis of the rotary electric machine is defined as an axial direction,
a direction that is perpendicular to the axial direction and to a vertical direction is defined as a front-rear direction,
a placement region of the inverter device in the vertical direction overlaps with a placement region of the rotary electric machine in the vertical direction,
the case includes a partition dividing the first chamber and the second chamber in the front-rear direction,
the first chamber includes a rotary electric machine housing portion that houses the rotary electric machine and a gear housing portion that houses the transmission mechanism,
the case includes a support wall dividing the rotary electric machine housing portion and the gear housing portion in the axial direction, and
the partition is formed at both sides in the axial direction relative to the support wall.

2. The vehicle drive apparatus according to claim 1, wherein a placement region of the partition in the axial direction overlaps with a placement region of the rotary electric machine in the axial direction and a placement region of the transmission mechanism in the axial direction.

3. The vehicle drive apparatus according to claim 1, wherein a first side in the axial direction is defined as a first axial side,
a second side in the axial direction is defined as a second axial side,
a first side in the front-rear direction is defined as a first front-rear side,
a second side in the front-rear direction is defined as a second front-rear side, and
the partition is formed to extend towards the first front-rear side closer to the second axial side.

4. The vehicle drive apparatus according to claim 1, wherein at least a portion of the partition overlaps with the rotary electric machine in the vertical direction and in the front-rear direction.

5. The vehicle drive apparatus according to claim 1, wherein the case includes a vertical direction dividing wall dividing the first chamber and the second chamber in the vertical direction.

6. The vehicle drive apparatus according to claim 1, wherein
the rotary electric machine is disposed on a first axis,
the differential gear mechanism is disposed on a second axis,
the transmission mechanism includes a counter gear mechanism disposed on a third axis that is different from and parallel to the first axis and the second axis,
the counter gear mechanism includes a first gear in mesh with a gear of the first axis and a second gear in mesh with a gear of the second axis,
the third axis is disposed below a virtual line that connects the first axis with the second axis in the vertical direction, and
the inverter device is disposed to overlap with the first gear in a vertical view.

* * * * *